United States Patent
Lee et al.

(10) Patent No.: US 10,944,853 B2
(45) Date of Patent: Mar. 9, 2021

(54) ELECTRONIC DEVICE INCLUDING SLIDABLE BODY

(71) Applicant: Samsung Electronics Co., Ltd., Gyeonggi-do (KR)

(72) Inventors: Younghoon Lee, Gyeonggi-do (KR); Woonbae Kim, Gyeonggi-do (KR); Chulhwan Lee, Gyeonggi-do (KR); Sungkyu Hwang, Gyeonggi-do (KR); Cheolsoo Kim, Gyeonggi-do (KR); Minwook Jin, Gyeonggi-do (KR); Howon Lee, Gyeonggi-do (KR); Chulho Bae, Gyeonggi-do (KR); Junghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/807,487

(22) Filed: Mar. 3, 2020

(65) Prior Publication Data
US 2020/0358887 A1    Nov. 12, 2020

(30) Foreign Application Priority Data
May 9, 2019  (KR) .................. 10-2019-0054360

(51) Int. Cl.
*H04B 1/38*     (2015.01)
*H04M 1/02*    (2006.01)

(52) U.S. Cl.
CPC ....... *H04M 1/0235* (2013.01); *H04M 1/0249* (2013.01); *H04M 1/0264* (2013.01)

(58) Field of Classification Search
CPC ............ H04M 1/0206; H04M 1/0235; H04M 1/0249; H04M 1/0264; H04M 1/0247
See application file for complete search history.

(56) References Cited

U.S. PATENT DOCUMENTS

| 10,129,376 B2 | 11/2018 | Cho et al. |
| 10,637,978 B2 | 4/2020 | Fan et al. |

(Continued)

FOREIGN PATENT DOCUMENTS

| CN | 206960841 U | 2/2018 |
| CN | 207926662 U | 9/2018 |

(Continued)

OTHER PUBLICATIONS

International Search Report dated Jun. 11, 2020.

*Primary Examiner* — Tuan Pham
(74) *Attorney, Agent, or Firm* — Cha & Reiter, LLC.

(57) ABSTRACT

According to certain embodiments, an electronic device may include a housing, a slidable body; a driver including: a drive motor, a rotatable drive shaft for the drive motor, and a nut frame including a latch projection, protruding in a direction of the slidable body, and a slide hinge disposed on the slidable body and coupled to the driver, wherein the slide hinge includes: a slide plate coupled to the slidable body, and a locker including a latch groove, into which the latch protrusion is inserted, wherein, when the latch projection is inserted into the latch groove, the slidable body is moved by the driver, and wherein the slide plate defines an escape area configured to receive at least a portion of the nut frame and/or the latch protrusion, when an external impact causes the latch protrusion to separate from the latch groove.

20 Claims, 23 Drawing Sheets

(56) References Cited

U.S. PATENT DOCUMENTS

| | | | |
|---|---|---|---|
| 2007/0155450 A1* | 7/2007 | Juan | H04M 1/0237 |
| | | | 455/575.4 |
| 2017/0064166 A1 | 3/2017 | Xiong et al. | |
| 2018/0262663 A1 | 9/2018 | Zhang | |
| 2019/0253542 A1* | 8/2019 | Fan | H04M 1/0237 |
| 2019/0302841 A1* | 10/2019 | Sun | G06F 1/1626 |

FOREIGN PATENT DOCUMENTS

| | | |
|---|---|---|
| EP | 3273669 A1 | 1/2018 |
| EP | 3139584 B1 | 7/2018 |
| KR | 10-2009-0029038 A | 3/2009 |
| KR | 10-1597222 B1 | 2/2016 |

* cited by examiner

ELECTRONIC DEVICE INCLUDING SLIDABLE BODY

CROSS-REFERENCE TO RELATED APPLICATION(S)

This application is based on and claims priority under 35 U.S.C. 119 to Korean Patent Application No. 10-2019-0054360, filed on May 9, 2019, in the Korean Intellectual Property Office, the disclosures of which are herein incorporated by reference in their entireties.

TECHNICAL FIELD

Certain embodiments of the disclosure relate to an electronic device including a slidable body.

BACKGROUND

Modern electronic devices have grown slimmer with each iterative generation. Slim devices are perceived as attractive and comfortable to consumers. Accordingly, there is a need to increase the rigidity of the devices to enable the slimmer design aesthetics of the device, and differentiate the functional elements of the same. In that regard, electronic devices are gradually moving beyond uniform rectangular shapes.

SUMMARY

Some devices now include a slidable body that extends from the housing. The slidable body may include one or more electrical components which perform one or more functions while protruding from the housing. Further, such slidable electronic devices may include structures designed specifically to prevent damage from external impacts (e.g., such as when the device is dropped accidentally).

The slidable body may be both extendable and stowable within the housing. When extended, it may be limited to extending to a predetermined reciprocating distance from the housing. The electrical component may be operable both when the slidable body is extended and stowed. For example, the component may include one or more sensors and/or cameras. The slidable body may be extendable using a driver disposed in the housing.

When the slidable body is extended from the device, the device may be particularly vulnerable to incurring damage from accidental drops and other such impacts.

Certain embodiments of the disclosure may provide an electronic device including a slidable body.

Certain embodiments of the disclosure may provide an electronic device including a slidable body for preventing damage when an external impact such as a drop occurs.

Certain embodiments of the disclosure may provide an electronic device including a slidable body configured to enable easy recovery, even if the slidable body is at least partially separated by an external impact such as a drop.

According to certain embodiments of the disclosure, an electronic device includes a housing, a slidable body coupled in the housing, a driver disposed in the housing and configured to drive movement of the slidable body, the driver including: a drive motor, a rotatable drive shaft disposed through the drive motor, and a nut frame including a latch projection disposed to reciprocate in a longitudinal direction of the rotatable drive shaft according to rotation of the rotatable drive shaft, and protruding in a direction of the slidable body, and a slide hinge disposed on the slidable body and coupled to the driver, wherein the slide hinge includes: a slide plate coupled to the slidable body, and a locker including a latch groove disposed on a same plane as that defined by a surface of the slide plate in the slidable body, and into which the latch protrusion is inserted, wherein, when the latch projection is inserted into the latch groove, the slidable body is moved by the driver, and wherein the slide plate defines an escape area configured to receive at least a portion of the nut frame and/or the latch protrusion, when an external impact causes the latch protrusion to separate from the latch groove.

According to certain embodiments of the disclosure, an electronic device includes a housing including a first cover, a second cover facing a direction opposite to that of the first cover, and a side member enclosing a space defined between the first cover and the second cover, the side member including a support member, a slidable body coupled to the housing and extendable from an interior of the housing to an exterior of the electronic device, a drive motor disposed in the support member, a rotatable drive shaft disposed through the drive motor, a nut frame including a latch protrusion disposed to reciprocate along a longitudinal axis of the rotatable drive shaft according to a rotation of the rotatable drive shaft and protruded in a direction of the slidable body, a slide plate fixed to the slidable body, and a locker comprising a latch groove disposed on a same plane as that defined by a surface of the slide plate in the slidable body and into which the latch protrusion is inserted, wherein, when the latch protrusion is inserted into the latch groove, the slidable body is moved by actuation of the drive motor, and wherein the slide plate defines an escape area configured to receive at least a portion of the nut frame and/or the latch protrusion, when an external impact causes the latch protrusion to separate from the latch groove.

BRIEF DESCRIPTION OF THE DRAWINGS

In the drawings, the same or similar reference numerals may be used for the same or similar components.

DETAILED DESCRIPTION

Figure 1:
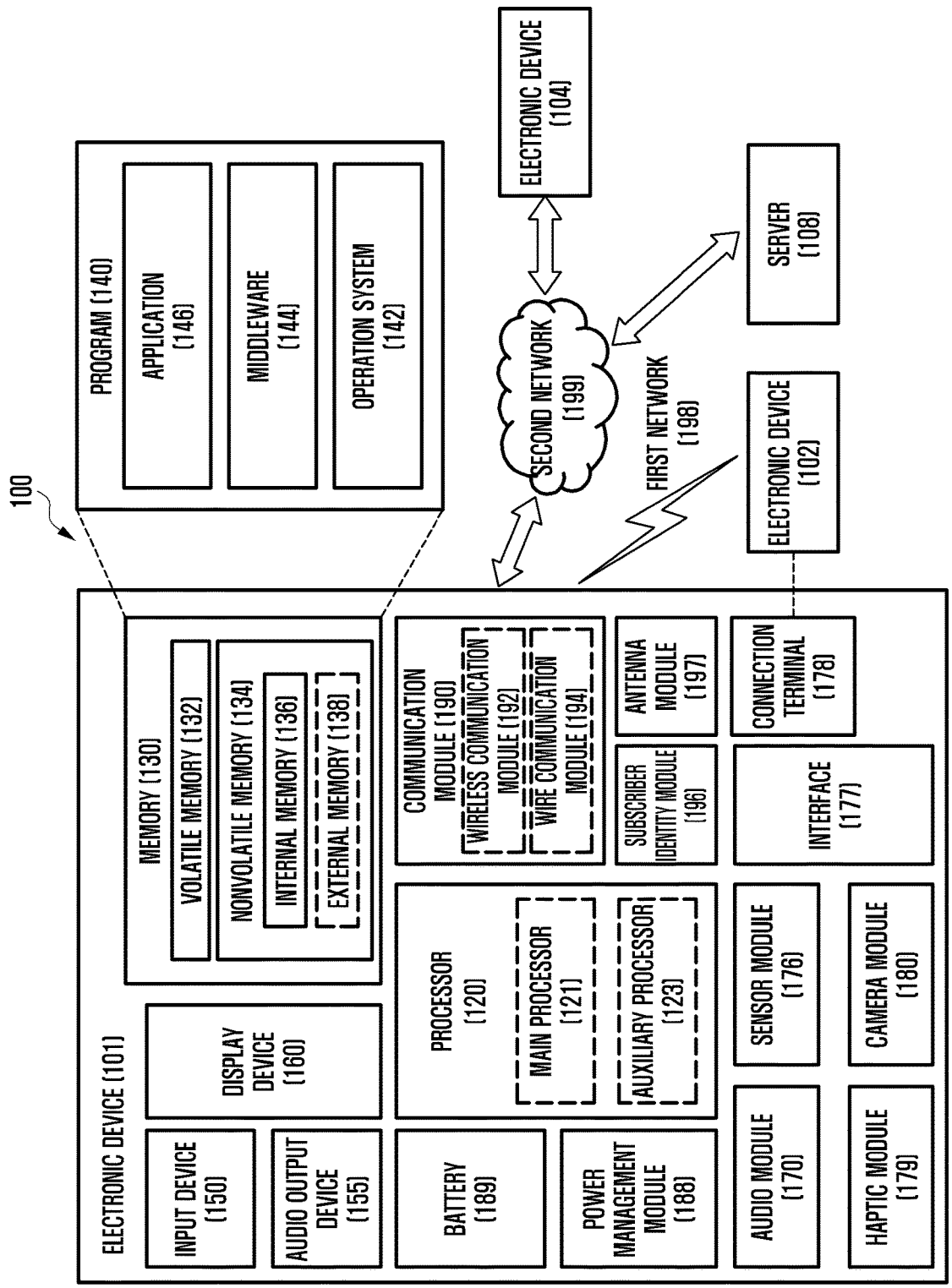
FIG. 1 is a block diagram illustrating a configuration of an electronic device in a network environment according to certain embodiments of the disclosure.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. (not shown) The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one of the components may be omitted from the electronic device 101, or one or more other components may be added in the electronic device 101. Some of the components may be implemented as single integrated circuitry. For example, the sensor module 176 may be implemented as embedded in the display device 160.

The processor 120 may execute a program 140 to control at least one other hardware or software component of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 (e.g., an image signal processor (ISP) or a CP) may be implemented as part of another component (e.g., the camera module 180 or the communication module 190) functionally related to the auxiliary processor 123.

The memory 130 may store various data used by at least one component of the electronic device 101, such as the program 140 and input data or output data for a command related thereto. The memory 130 may include the volatile memory 132 or the non-volatile memory 134.

The program 140 may be stored in the memory 130 as software and may include an operating system (OS) 142, middleware 144, and applications 146.

The input device 150 may receive a command or data to be used by the processor 120 of the electronic device 101, from the outside (e.g., a user) of the electronic device 101. The input device 150 may include a microphone, a mouse, a keyboard, or a digital pen.

The audio output device 155 may output sound signals to the outside of the electronic device 101 and may include a speaker or a receiver. The speaker may be used for general purposes, such as playing multimedia or playing record, and the receiver may be used for receiving incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor.

The interface 177 may support one or more specified protocols to be used for the electronic device 101 to be coupled with the external electronic device 102 directly (e.g., wiredly) or wirelessly. The interface 177 may include a high definition multimedia interface (HDMI), a universal serial bus (USB) interface, a secure digital (SD) card interface, or an audio interface.

A connection terminal 178 may include a connector via which the electronic device 101 may be physically connected with the external electronic device 102. The connection terminal 178 may include an HDMI connector, a USB connector, an SD card connector, or an audio connector.

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101 and may include a primary cell which is not rechargeable, a secondary cell which is rechargeable, or a fuel cell.

The communication module 190 may support establishing a direct communication channel or a wireless communication channel between the electronic device 101 and the external electronic device and performing communication via the established communication channel. The communication module 190 may include one or more communication processors that are operable independently from the processor 120 (e.g., the AP) and supports a direct communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the external electronic device. The antenna module 197 may include an antenna including a radiating element implemented using a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

An electronic device according to an embodiment may be one of various types of electronic devices, including, but not limited to a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
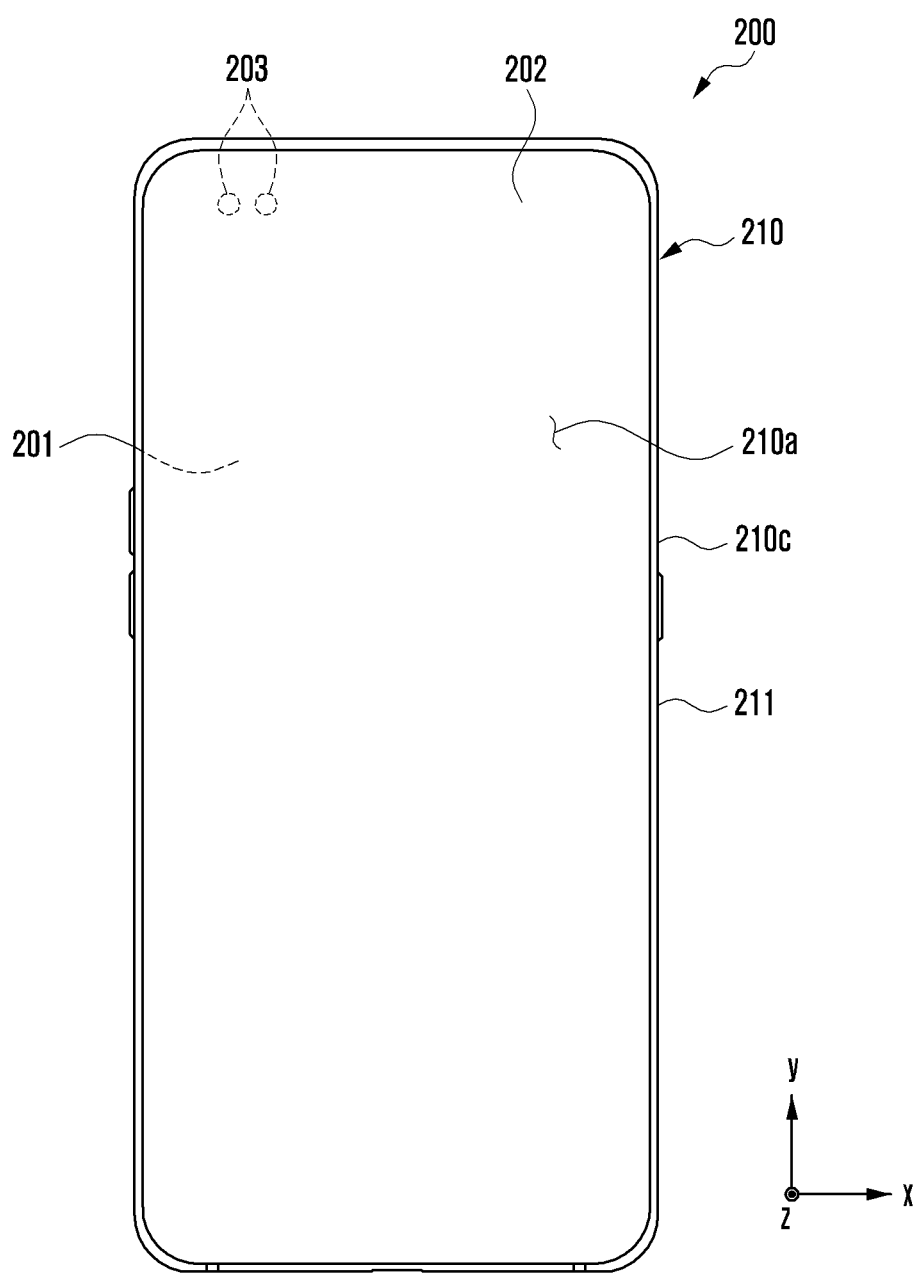
FIGS. 2A and 2B are front and rear views illustrating an electronic device with a slidable body inserted according to certain embodiments of the disclosure.
Figure 2B:
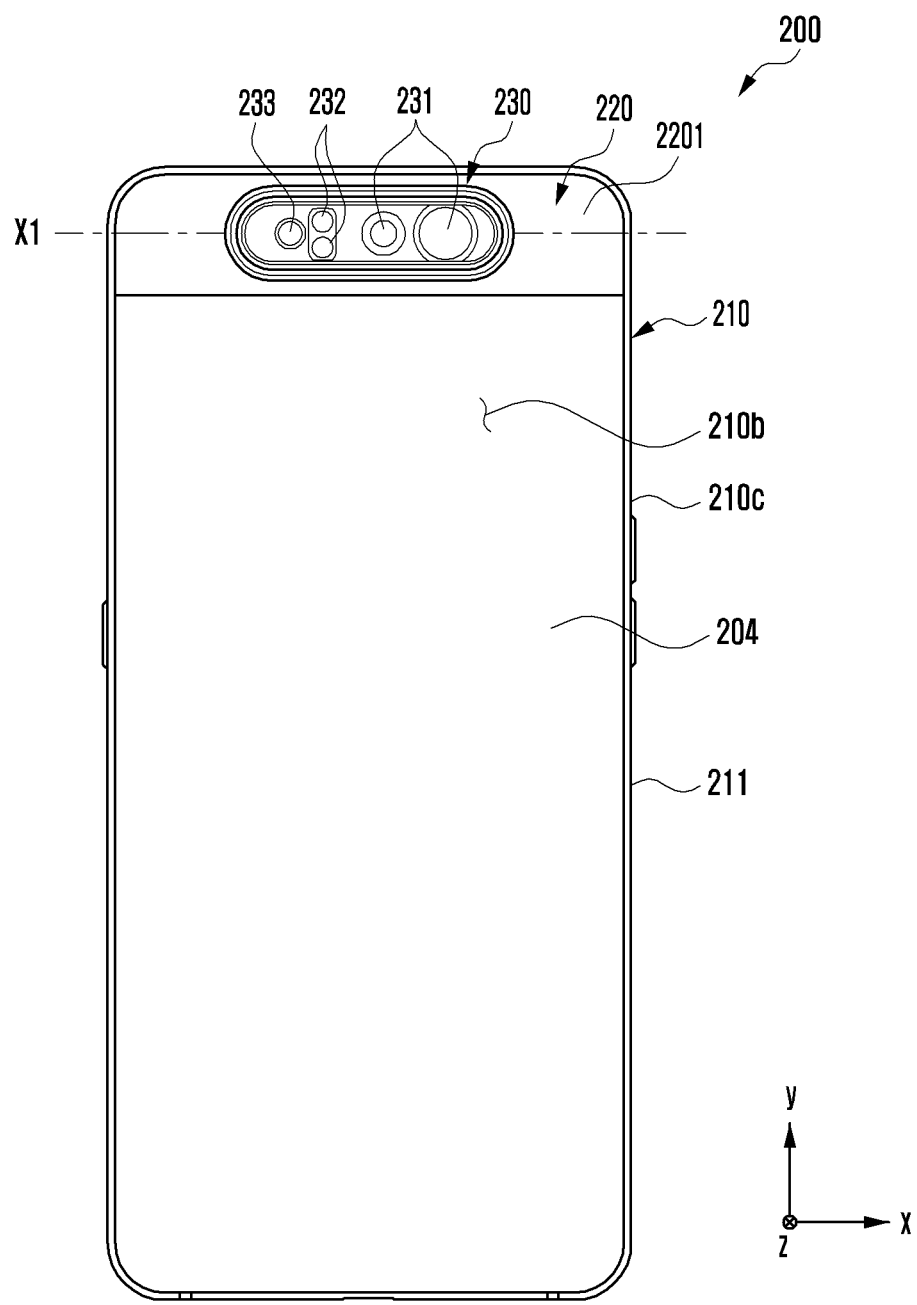
Figure 3A:
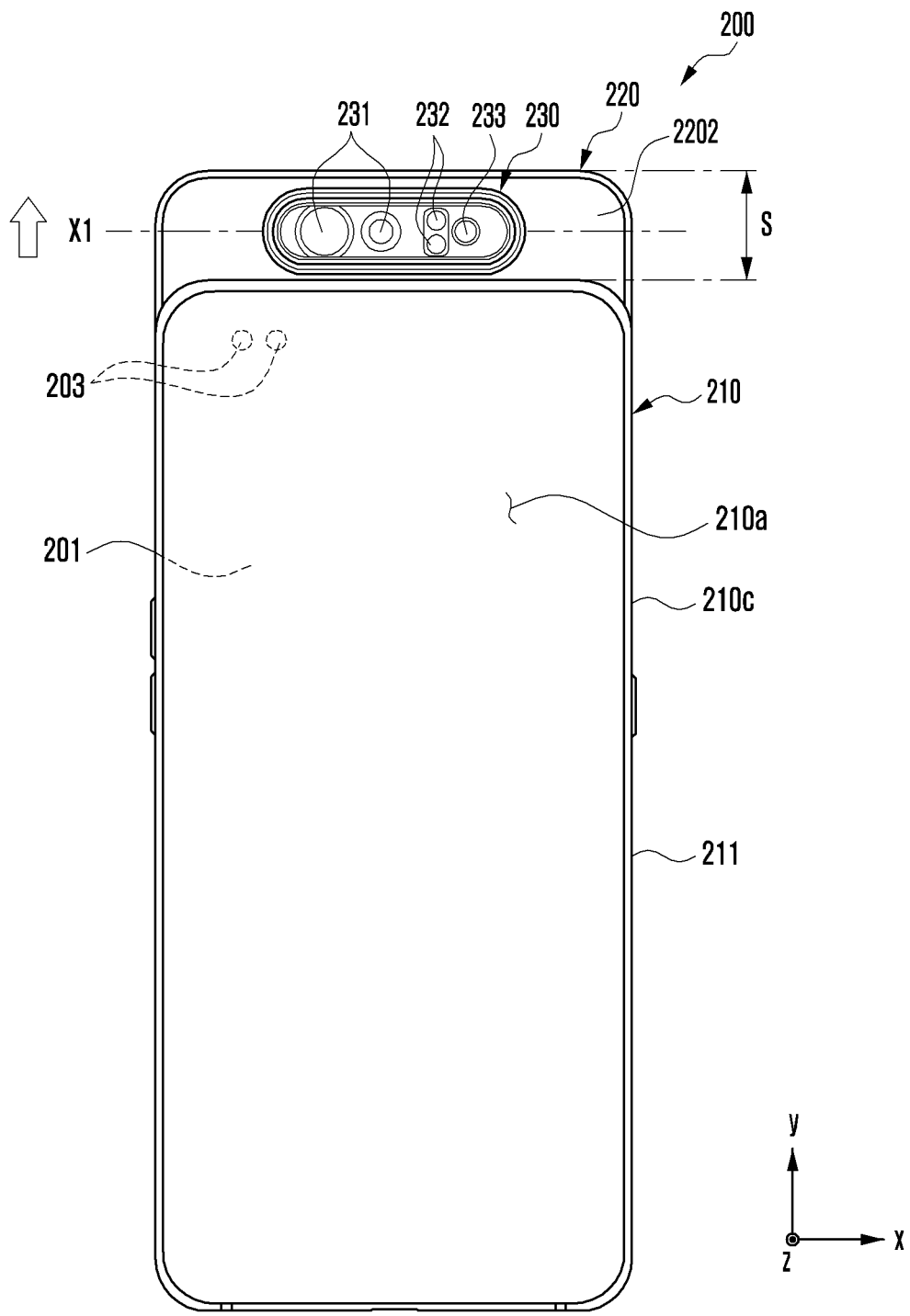
FIGS. 3A and 3B are front and rear views illustrating an electronic device with a slidable body protruded according to certain embodiments of the disclosure.
Figure 3B:
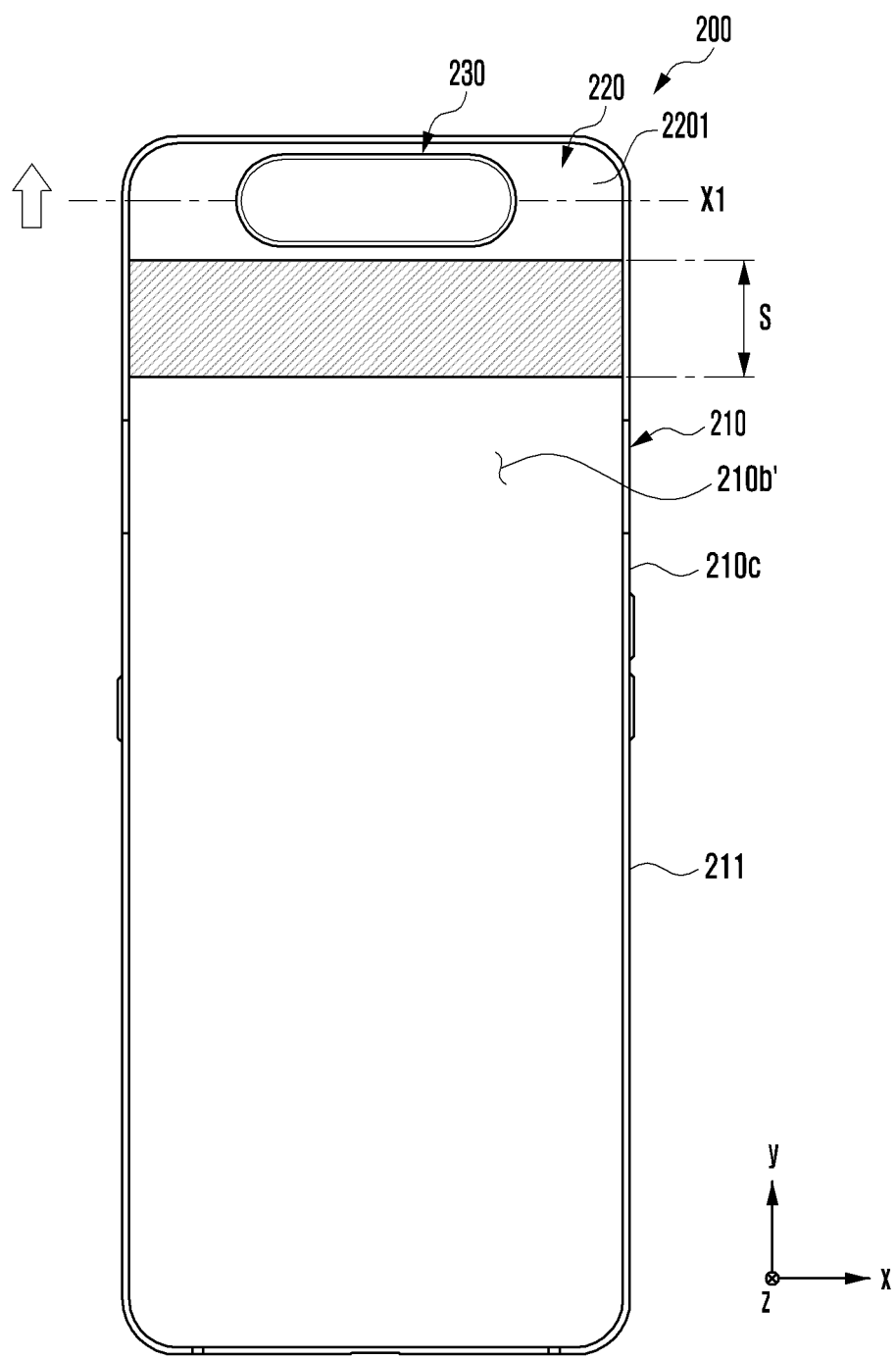

FIGS. 2A and 2B are front and rear views illustrating an electronic device 200 with a slidable body 220 inserted according to certain embodiments of the disclosure. FIGS. 3A and 3B are front and rear views illustrating an electronic device 200 with a slidable body 220 protruded according to certain embodiments of the disclosure.

The electronic device 200 of FIGS. 2A to 3B may be at least partially similar to the electronic device 101 of FIG. 1 or may further include other components of the electronic device.

With reference to FIGS. 2A to 3B, the electronic device 200 may include a housing structure 210 including a front surface 210a (e.g., first surface), a rear surface 210b or 210b' (e.g., second surface) facing in a direction opposite to that of the front surface 210a, and a side surface 210c at least partially enclosing a space between the front surface 210a and the rear surface 210b or 210b'. According to an embodiment, the front surface 210a may be formed by a front cover 202 (e.g., front plate or display window) (e.g., polymer plate or glass plate including various coating layers) in which at least a portion is substantially transparent. According to an embodiment, the front cover 202 may be disposed to form substantially an entire area of the front surface 210a. According to an embodiment, at least a portion of the rear surface 210b or 210b' may be formed through a substantially opaque rear cover 204 (e.g., rear plate). According to an embodiment, the rear cover 204 may be formed by, for example, coated or colored glass, ceramic, polymer, metal (e.g., aluminum, stainless steel (STS), or magnesium), or a combination of at least two of the above materials. According to an embodiment, the side surface 210c may be coupled to at least a portion of the front cover 202 and the rear cover 204 and be formed by a side member 211 (e.g., side bezel structure) including a metal and/or a polymer. In another embodiment, at least a portion of the rear cover 204 and the side member 211 may be integrally formed and include the same material (e.g., metal material such as aluminum).

According to certain embodiments, the front cover 202 may be formed in a flat portion in which substantially an entire area is flat. In another embodiment, the front cover 202 may include a curved portion formed at one end or both ends of a long edge thereof and extended from a central flat portion. According to an embodiment, the rear cover 204 may be formed in a flat portion in which substantially an entire area is flat. In another embodiment, the rear cover 204 may include a curved portion formed at one end or both ends of a long edge thereof and extended from a central flat portion.

According to certain embodiments, the electronic device 200 may include a slidable body 220 slidably installed to be inserted into or protruded from the housing structure 210 by at a predetermined reciprocating distance. According to an embodiment, the electronic device 200 may be configured such that an area of the rear surface 210b or 210b' of the housing structure 210 is changed through a protruding operation of the slidable body 220. According to an embodiment, the slidable body 220 may include a first slide cover 2201 facing in the same direction as that of the rear cover 204 and a second slide cover 2202 facing in a direction opposite to that of the first slide cover 2201 and facing in the same direction as that of the front cover 202. According to an embodiment, when the slidable body 220 is inserted into the housing structure 210, an outer surface of the first slide cover 2201 and an outer surface of the rear cover 204 are coupled to correspond to each other; thus the first rear surface 210b may have a substantially same area as that of the front cover 202. In this case, the second slide cover 2202 may be disposed to be invisible from the outside with inserted into the housing structure 210. According to an embodiment, when the slidable body 220 is extended from the housing structure 210, the first slide cover 2201 is extended a predetermined moving distance S from the rear cover 204 in an upwards direction (e.g., the y-axis direction of FIG. 3A); thus, a changed second rear surface 210b' may have an area larger than that of the front cover 202 may be formed. In this case, the second slide cover 2202 may be moved to a position in which at least a portion may be visible from the outside when viewed from above the front cover 202.

According to certain embodiments, the slidable body 220 may include a camera module assembly 230 rotatably disposed based on a rotation axis X1 according to a sliding operation. According to an embodiment, the camera module assembly 230 may be installed to be at least partially rotatable in an internal space of the slidable body 220. According to an embodiment, the camera module assembly 230 may include at least one camera module 231 disposed to be exposed to the outside in an internal space of the camera housing.

According to an embodiment, the camera module assembly 230 may be disposed in a position in which the camera module 231 may photograph a subject of a direction facing the rear cover 204 in a state in which the slidable body 220 is inserted into the housing structure 210. According to an embodiment, the camera module assembly 230 rotates using an X1 axis as a rotation axis in a state in which the slidable body 220 is protruded from the housing structure 210; thus the camera module 231 may be disposed at a position that may photograph a subject in a direction in which the front cover 202 faces. According to an embodiment, the camera module assembly 230 may include a flash 233 or at least one sensor module 232 in addition to the camera module 231. According to an embodiment, the at least one sensor module 232 may generate an electrical signal or a data value corresponding to an operating state inside the electronic device 200 and/or an external environment state thereof. According to an embodiment, the at least one sensor module 232 may include at least one of a proximity sensor, illuminance sensor, ultrasonic sensor, time of flight (TOF) sensor, or heart rate monitoring (HRM) sensor.

Figure 4:
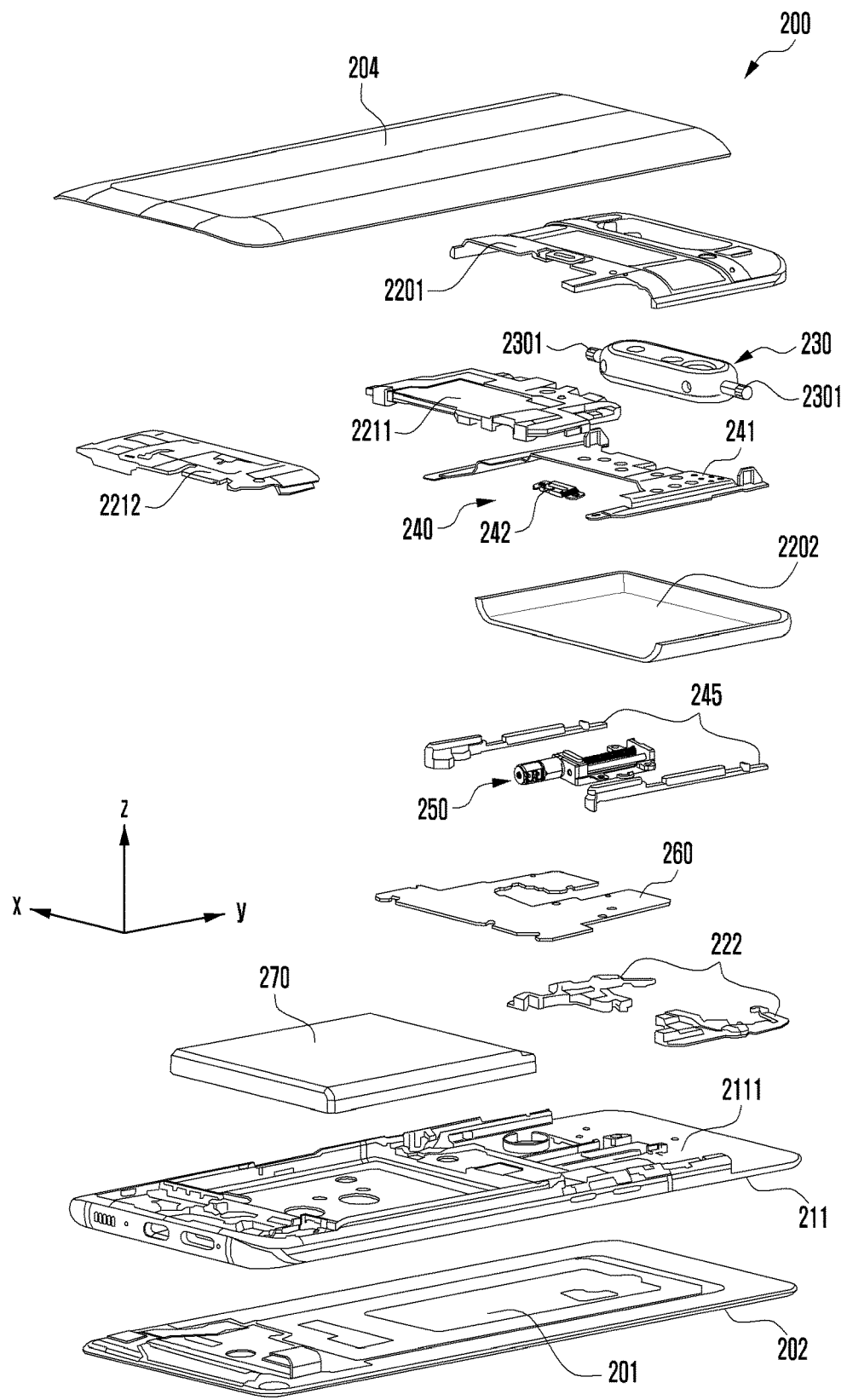
FIG. 4 is an exploded perspective view illustrating an electronic device according to certain embodiments of the disclosure.

According to certain embodiments, when detecting an event (e.g., front camera photographing mode or selfie photographing mode), a processor (e.g., the processor 120 of FIG. 1) of the electronic device 200 may automatically protrude the slidable body 220 from the housing structure 210 through a driver (e.g., a driver 250 of FIG. 4). In this case, the camera module assembly 230 may be rotated through an rotation axis X1 such that at least one camera module 231 faces a direction in which the front cover 202 faces in conjunction with a protruding operation of the slidable body 220. In another embodiment, when an event (e.g., front camera photographing mode or selfie photographing mode) is ended or a state is changed, the processor (e.g., the processor 120 of FIG. 1) of the electronic device 200 may automatically insert the slidable body 220 into the housing structure 210 through the driver. In this case, the camera module assembly 230 may be rotated through the rotation axis X1 such that at least one camera module 231 faces a direction in which the rear cover 204 faces in conjunction with an inserting operation of the slidable body 220.

According to certain embodiments, the electronic device 200 may include a display 201 (e.g., flexible display) disposed to be visible from the outside through at least a portion (substantially, most of the front surface 210a) of the front cover 202 in an internal space. According to an embodiment, the electronic device 200 may include at least one sensor module 203 disposed in an internal space and capable of detecting an external environment through the front cover 202 and/or the display 201. According to an embodiment, the at least one sensor module 203 may include an optical flow sensor (e.g., illuminance sensor, biometric sensor, ultrasonic sensor, or TOF sensor). Although not illustrated, the electronic device 200 may include a gesture sensor, gyro sensor, atmospheric pressure sensor, magnetic sensor, acceleration sensor, grip sensor, color sensor, infrared (IR) sensor, temperature sensor, or humidity sensor disposed in an internal space and for detecting an internal operating state and/or an external environmental state thereof.

Although not illustrated, the electronic device 200 may include at least one of an input device (e.g., at least one key button or microphone module) disposed in an internal space and disposed to be at least partially exposed to the outside, a sound output device (e.g., receiver, ear jack assembly, or at least one external speaker module), or a connector (e.g., interface connector port).

According to certain embodiments, the electronic device 200 may include a coupling structure for connecting the slidable body 220 and the driver (e.g., the driver 250 of FIG. 4) disposed in the internal space. According to an embodiment, the coupling structure may include a nut frame (e.g., a nut frame 254 of FIG. 6) including a latch protrusion (e.g., a latch protrusion 2541 of FIG. 6) to be described later and a locker (e.g., a locker 242 of FIG. 6) including a latch groove (e.g., a latch groove 2421 of FIG. 6) inserted to latch the latch protrusion 2541.

According to an example embodiment of the disclosure, in a state in which the slidable body 220 is protruded from the housing structure 210 through the coupling structure, when an external impact such as a drop occurs, the latch protrusion 2541 is separated from the latch groove 2421; thus, the slidable body 220 and/or the driver 250 may be prevented from being damaged. According to an embodiment, the electronic device 200 may have an escape structure for receiving at least a portion of the nut frame 254 separated from the latch groove 2421 and/or the latch protrusion 2541. According to an embodiment, at least a portion of the nut frame 254 separated from the latch groove 2421 and/or the latch protrusion 2541 may be received in the escape structure, thereby preventing deformation or damage of a peripheral structure.

Figure 5:
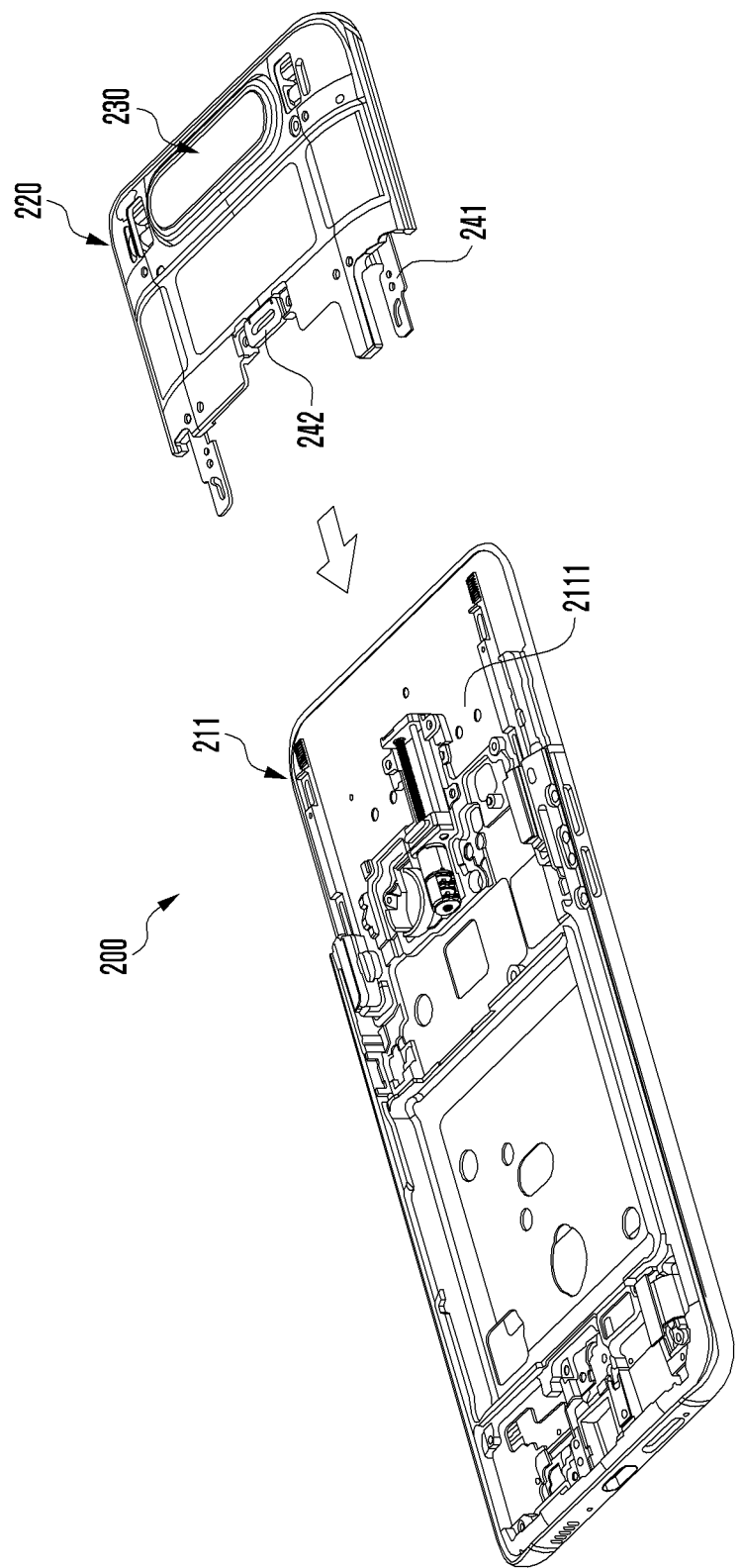
FIG. 5 is an exploded perspective view illustrating a side member and a slidable body according to certain embodiments of the disclosure.

FIG. 4 is an exploded perspective view illustrating an electronic device 200 according to certain embodiments of the disclosure. FIG. 5 is an exploded perspective view illustrating a side member 211 and a slidable body 220 according to certain embodiments of the disclosure.

With reference to FIGS. 4 and 5, the electronic device 200 may include a front cover 202, a rear cover 204 facing in a direction opposite to that of the front cover 202, and a side member 211 which, with the front cover 202 and rear cover 204, defines a space between the front cover 202 and the rear cover 204. According to an embodiment, the side member 211 may include a side surface (e.g., the side surface 210c of FIG. 1) forming at least part of an external shape of the electronic device 200 and a support member 2111 (e.g., a support structure) extending at least partially from the side surface to the internal space, which supports at least one electronic component disposed within the electronic device 200. According to an embodiment, the electronic device 200 may include a display 201 disposed in the internal space, which may be visible from an exterior of the device, through at least a portion of the front cover 202. According to an embodiment, the electronic device 200 may include a battery 270 and at least one printed circuit board (PCB) 260 disposed adjacent with the battery 270, or at least partially overlapping with the battery 270, which are at least one electronic component disposed to be supported by the support member 2111 in the internal space. According to an embodiment, the electronic device 200 may include at least one rear bracket 2211 and 2212 coupled to at least a portion of the support member 2111 to reinforce rigidity of the electronic device 200 and to protect internal electronic components.

According to certain embodiments, the electronic device 200 may include a slidable body 220 which is movable to extend from the side member 211 to an exterior of the electronic device 200. According to an embodiment, the slidable body 220 may include a first slide cover 2201 disposed to face the same direction as that of the rear cover 204 and a second slide cover 2202 disposed to face in a direction opposite to that of the first slide cover 2201. According to an embodiment, the slidable body 220 may include a camera module assembly 230 for enabling at least one camera module (e.g., the camera module 231 of FIG. 2B) to be exposed to the outside of the electronic device and disposed to rotate according to a sliding operation of the slidable body 220.

According to certain embodiments, the electronic device 200 may include a slide hinge 240 disposed between the slidable body 220 and the side member 211, the slide hinge 240 guiding reciprocal movement of the slidable body 220 in the Y-axis direction (as illustrated) from the side member 211, and a driver 250 disposed in the internal space of the electronic device 200 and connected to at least a portion of the slide hinge 240 to provide actuation for movement of the slidable body 220. According to an embodiment, the slide hinge 240 may include a slide plate 241 disposed at the slidable body 220 and slidably connected to at least one slide bracket 222, as coupled to the side member 211 and a locker 242 disposed at the slidable body 220. According to an embodiment, the locker 242 may be connected to a nut frame (e.g., the nut frame 254 of FIG. 6) to be described later of the driver 250, thereby transferring a driving force received from the driver 250 to the slidable body 220. According to certain embodiments, the electronic device 200 may include at least one rack gear module 245 including a rack gear disposed at the slide plate 241 and engaged with a pinion gear of at least one pinion gear module 2301 of the camera module assembly 230. According to an embodiment, the at least one rack gear module 245 is moved together with the slide plate 241 to a predetermined movement distance when the slidable body is protruded and then the at least one rack gear module 245 is disposed so that the slide plate 241 moves, thereby inducing a self-rotation of the camera module assembly 230.

Figure 6:
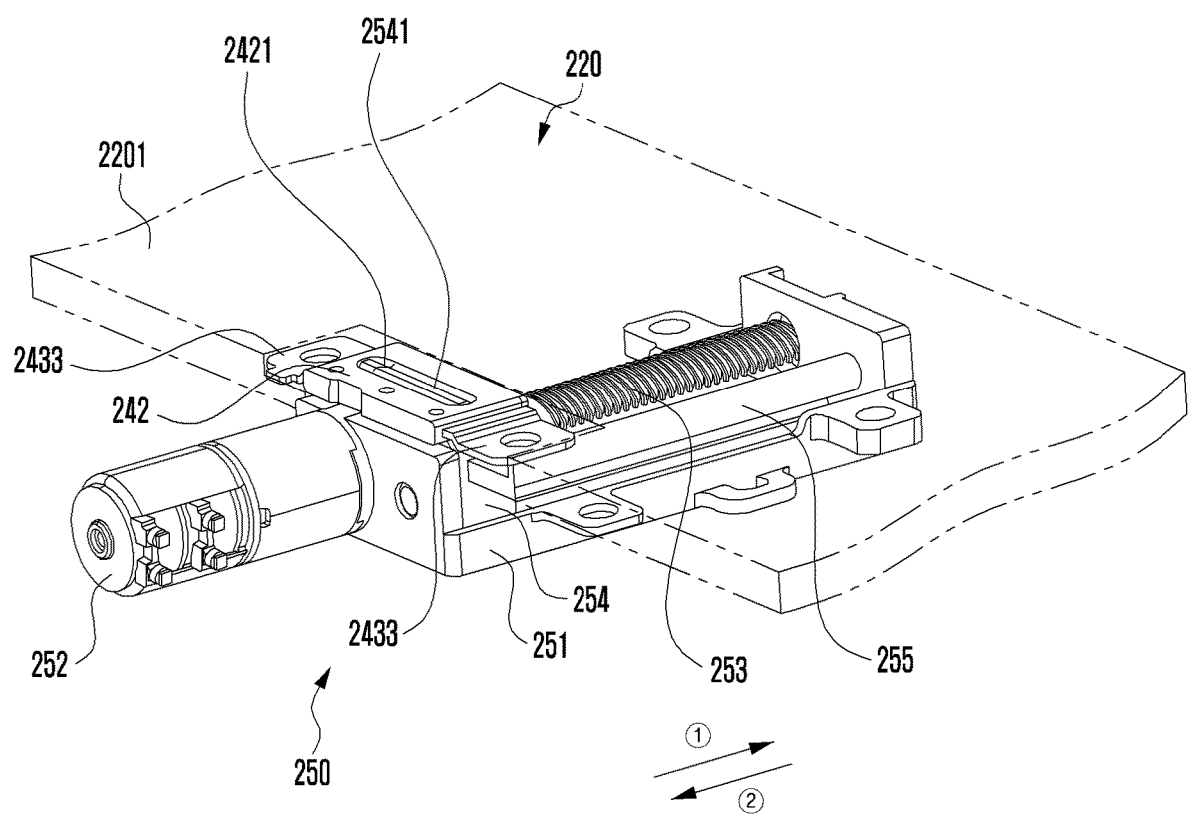
FIG. 6 is a perspective view illustrating a configuration of a driver according to certain embodiments of the disclosure.

FIG. 6 is a perspective view illustrating a configuration of a driver 250 according to certain embodiments of the disclosure.

With reference to FIG. 6, the driver 250 may include a motor housing 251 disposed in an internal space of an electronic device (e.g., the electronic device 200 of FIG. 4), a drive motor 252 disposed to receive the support of the motor housing 251, a driving shaft 253 rotatably disposed in the motor housing 251 so as to receive a rotational force of the drive motor 252, and a nut frame 254 disposed to move in a direction (direction ①) in which the slidable body 220 is protruded or a direction (direction ②) in which the slidable body 220 is inserted according to a rotation of the driving shaft 253. According to an embodiment, the motor housing 251 may be fixed to the support member (e.g., the support member 2111 of FIG. 4) through a screw. According to an embodiment, the driving shaft 253 may include a thread formed along an outer circumferential surface, and the nut frame 254 through which the driving shaft 253 penetrates may also include a thread formed in an inner circumferential surface of the through hole. Therefore, the thread of the driving shaft 253 and the thread of the nut frame 254 are screwed together; thus, the nut frame 254 may be guided to move linearly in a direction (e.g., direction ① or ②) perpendicular to a direction of rotation according to the rotation of the driving shaft 253. According to an embodiment, the driver 250 may further include a guide shaft 255 disposed in a manner penetrating the nut frame 254 near the driving shaft 253 to not rotate in synchronization with a rotation of the driving shaft 253 and to guide the nut frame 254 so as to perform a linear motion in a longitudinal direction of the driving shaft 253. According to an embodiment, the nut frame 254 may include a latch protrusion 2541 protruded in a direction of a rear cover (e.g., the rear cover 204 of FIG. 4).

According to certain embodiments, the slidable body 220 may include a locker 242 having a latch groove 2421 formed therein. According to an embodiment, the slidable body 220 is slidably assembled in the side member (e.g., the side member 211 of FIG. 4), and a driving force of the drive motor 252 may be transferred to the slidable body 220 through a coupling structure in which the latch protrusion 2541 of the nut frame 254 is inserted into the latch groove 2421 of the locker 242. According to an embodiment, the locker 242 may include at least one flange 2433 including a screw hole and be fixed to the first slide cover 2201 of the slidable body 220 through the screw.

Figure 7A:
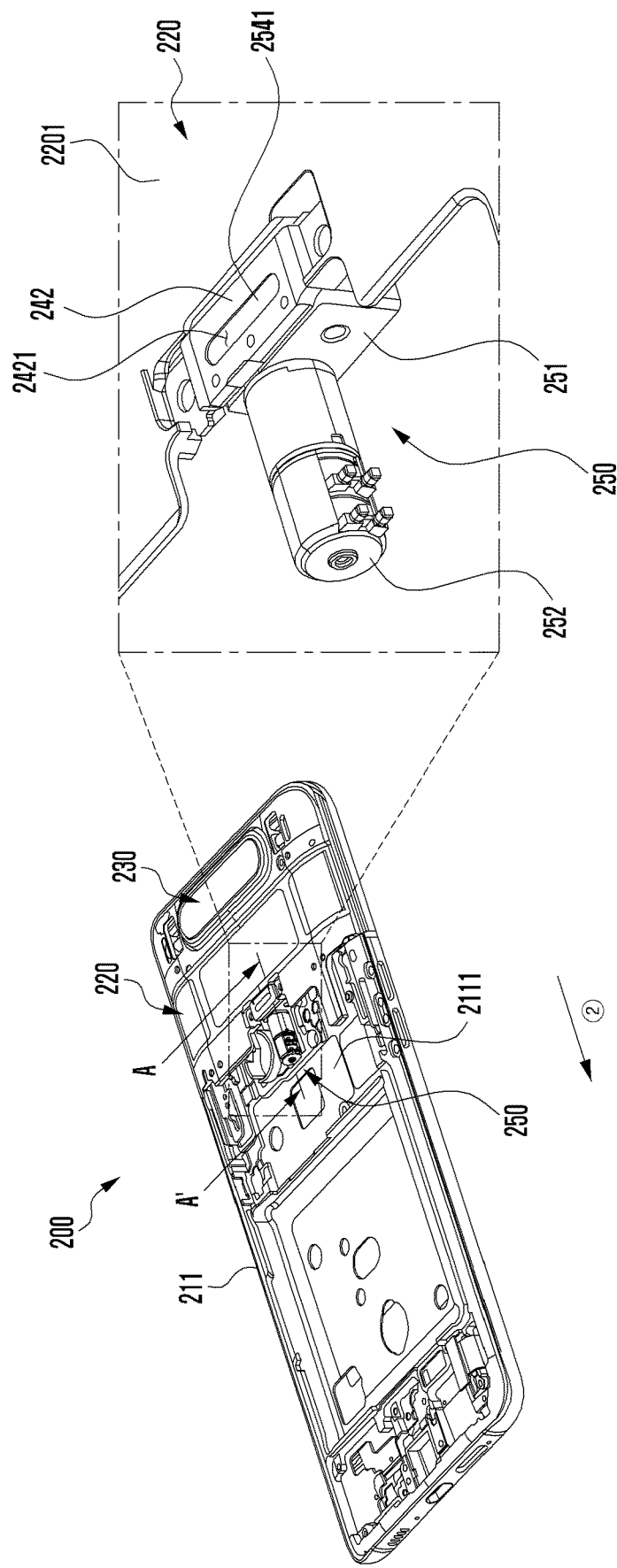
FIGS. 7A and 7B are partial perspective views illustrating an inserted and protruded state of a slidable body through a driver according to certain embodiments of the disclosure.
Figure 7B:
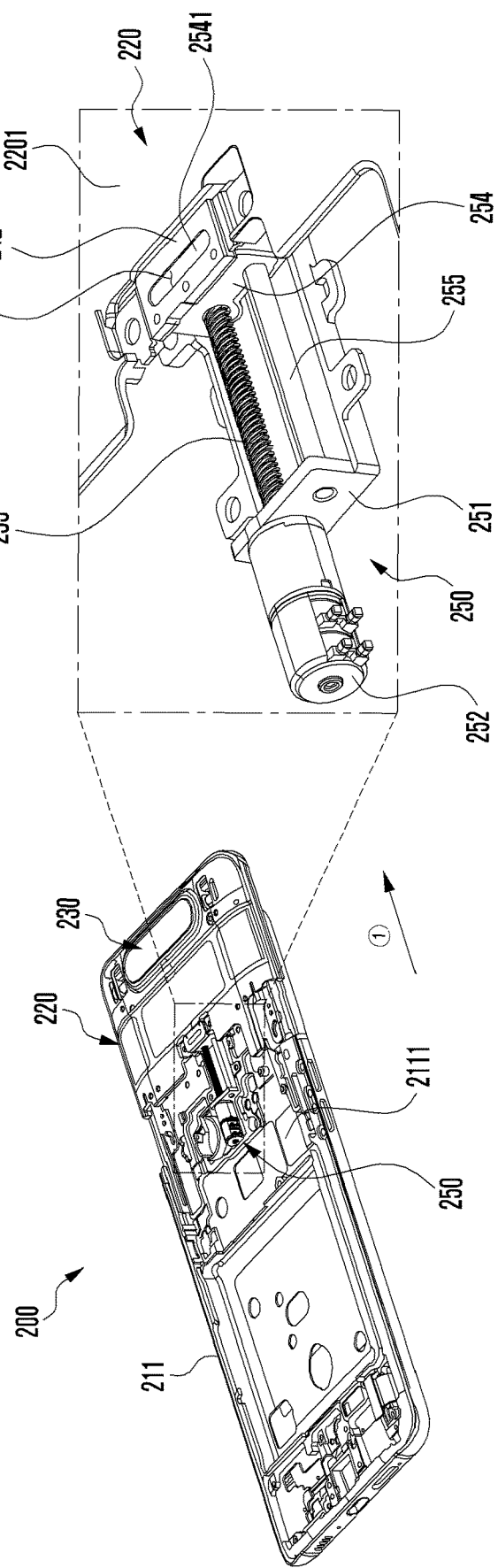
Figure 8:
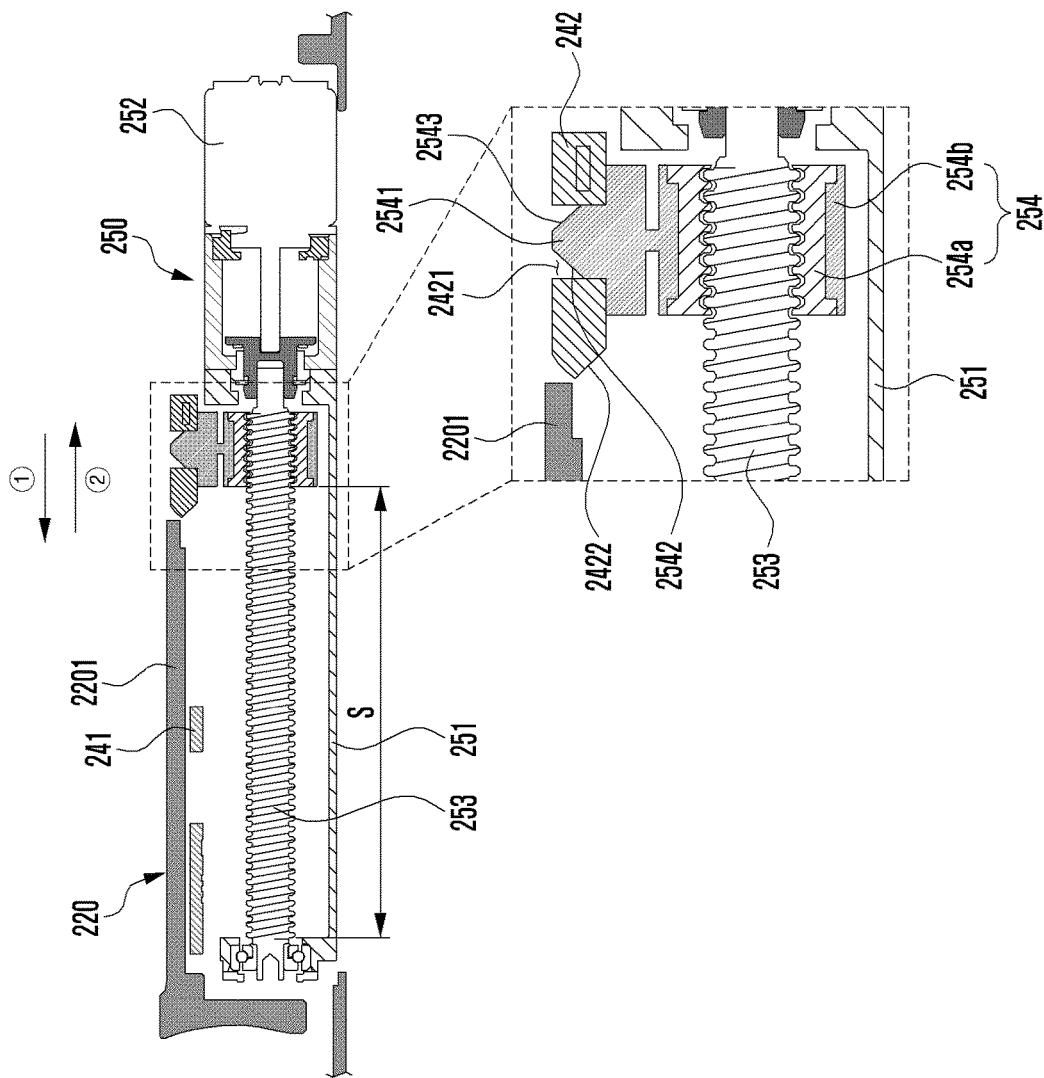
FIG. 8 is a partial cross-sectional view illustrating the electronic device viewed along line AA' of FIG. 7A according to certain embodiments of the disclosure.

FIGS. 7A and 7B are partial perspective views illustrating an inserted and protruded state of a slidable body 220 through a driver 250 according to certain embodiments of the disclosure. FIG. 8 is a partial cross-sectional view illustrating the electronic device 200 viewed along line A-A' of FIG. 7A according to certain embodiments of the disclosure.

With reference to FIGS. 7A and 7B, the slidable body 220 may be slidably coupled through the side member 211. In this case, the slidable body 220 may be connected to the nut frame 254 of the driver 250 through the locker 242. For example, the slidable body 220 may receive a driving force via connection to the driver 250 based on a manner in which the latch projection 2541 of the nut frame 254 is inserted into and latched to the latch groove 2421 of the locker 242.

According to certain embodiments, the slidable body 220 is moved in a direction (e.g., direction ②) based on a first rotational direction of the driving shaft 253 connected to the drive motor 252, and is thereby inserted and/or stowed into the side member 211. According to an embodiment, the slidable body 220 is moved in another direction (e.g., direction ①) through a second rotational direction of the driving shaft 253 connected to the drive motor 252, and is thereby extended from the side member 211. In this case, a driving force of the drive motor 252 may be transferred to the driving shaft 253 and then to the slidable body 220 through the nut frame 254, which linearly moves in a longitudinal direction of the driving shaft 253 according to a rotation of the driving shaft 253 and the locker 242 coupled to the nut frame 254.

With reference to FIG. 8, the nut frame 254 may include a conductive portion 254a and a polymer portion 254b. According to an embodiment, the conductive portion 254a includes a metal member and may be applied to a portion engaged with the driving shaft 253 in consideration of durability and rigidity. According to an embodiment, the polymer portion 254b may be insert injected to enclose at least a portion of the conductive portion 254a or may be formed through structural coupling. According to an embodiment, the latch projection 2541 may be extended from the polymer portion 254b.

According to certain embodiments, when the slidable body 220 is extended (e.g., the state of FIG. 7B), and when the slidable body 220 then receives an excessive force or impact in a particular direction (e.g., ②) in which the slidable body 220 is to be inserted by an external impact such as a drop, the latch projection 2541 of the nut frame 254 may be separated (e.g., detached) from the latch groove 2421 of the locker 242.

According to certain embodiments, the latch protrusion 2541 of the nut frame 254 may include a separation structure allowing easy separated from the latch groove 2421 when an external impact is transferred to the same. For example, the latch projection 2541 may include inclined portions 2542 and 2543 which are tapered as to have a gradually smaller widths as advancing toward their terminal edges thereof. According to an embodiment, the at least one inclined portion 2542 and 2543 may include a first inclined portion 2542 formed in a protruding direction (direction ①) of the slidable body 220 and a second inclined portion 2543 facing in a direction opposite to that of the first inclined portion 2542 and formed in an insertion direction (direction ②) of the slidable body 220. For example, in a state in which the slidable body 220 is at least partially protruded, when the slidable body 220 is pressed in a direction to be inserted by an external impact, the first inclined portion 2542 may be formed in a guide structure in which the slidable body 220 may be easily separated from the latch groove 2421. According to an embodiment, the second inclined portion 2543 may be formed in a guide structure in which the latch projection 2541 may be easily inserted into the latch groove 2421 while moving in a direction (direction ①) in which the slidable body 220 is protruded by a user manipulation in a state in which the latch protrusion 2541 is separated from the latch groove 2421 and in which the slidable body 220 is inserted. According to an embodiment, in order to easily guide the latch projection 2541 to the latch groove 2421 along the second inclined portion 2543, the locker 242 may include an inclined surface 2422 formed in a corresponding portion.

Figure 9:
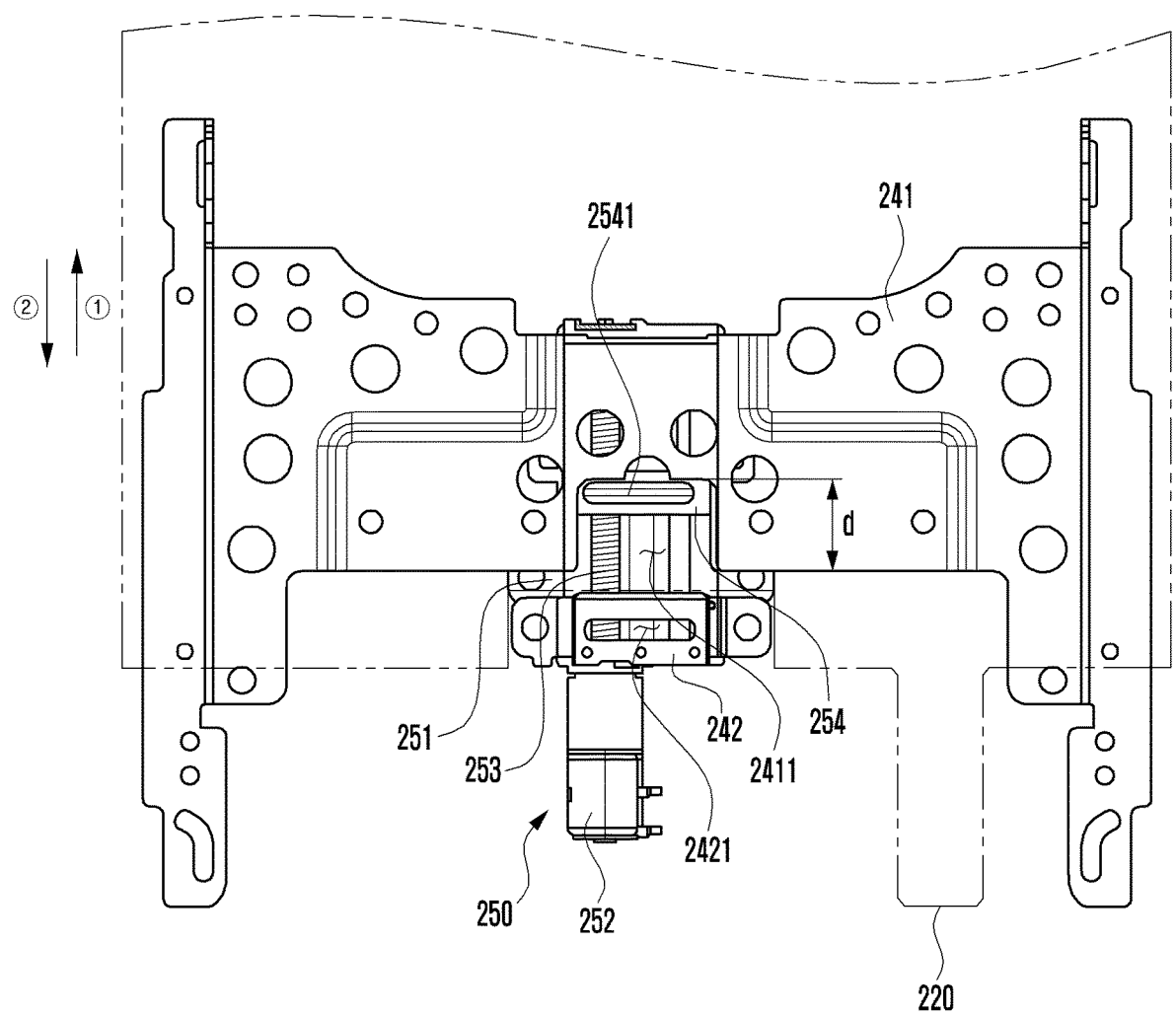
FIG. 9 is a diagram illustrating a slide plate including an escape area for receiving a nut frame separated from a locker according to certain embodiments of the disclosure.

FIG. 9 is a diagram illustrating a slide plate 241 including an escape area 2411 for receiving a nut frame 254 separated from a locker 242 according to certain embodiments of the disclosure.

According to an example embodiment of the disclosure, the slide plate 241 may be formed in a substantially flat shape disposed on the same plane as that of at least a portion of the nut frame 254 and/or the latch projection 2541 for slimming the electronic device. For example, when the latch projection 2541 of the nut frame 254 is separated from the latch groove 2421 of the locker 242 by an external impact, and the slidable body 220 is moved in a direction to be inserted, the slide plate 241 fixed to the slidable body 220 is latched to at least a portion of the nut frame 254 and/or the latch projections 2541; thus, the nut frame 254 may be broken, the guide shaft 255 may be deformed, or the slide plate 241 may be deformed. According to an embodiment, even when the latch projection 2541 is separated from the latch groove 2421, the slidable body 220 may be interrupted without being separated from the side member 211 (e.g., housing structure) of the electronic device 200 and be moved within a predetermined reciprocating movement distance (movement distance S of FIG. 8) of the slidable body 220.

As illustrated in FIG. 9, the slide plate 241 may include an escape area 2411 for receiving a portion of the nut frame 254 and/or the latch projection 2541 separated from the locker 242 by an external impact. According to an embodiment, the escape area 2411 may include an area omitted by a predetermined escape depth d in an inward direction from an edge of the slide plate 241. According to an embodiment, the escape depth d of the escape area 2411 may be determined based on a distance (e.g., the remaining moving distance S2 of FIG. 14B) between a position in which the latch protrusion 2541 is separated from the latch groove 2421 by an external impact and a position in which the latch protrusion 2541 is inserted into the latch groove 2421.

Figure 10:
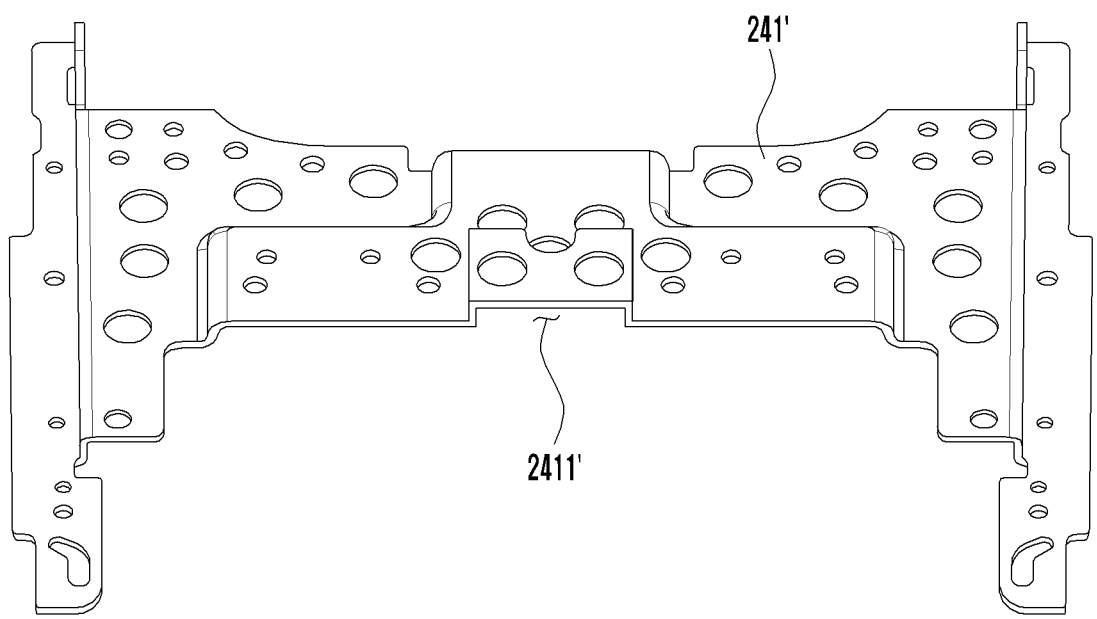
FIG. 10 is a diagram illustrating a slide plate according to certain embodiments of the disclosure.

FIG. 10 is a diagram illustrating a slide plate 241' according to certain embodiments of the disclosure. Contrary to other embodiments of the invention, the slide plate 241' of FIG. 10 includes an escape area 2411' of the slide plate 241' which is formed higher to be than a peripheral surface. In this case, at least a portion of the nut frame 254 separated from the latch groove 2421 and/or the latch projection 2541 are/is received into the escape area 2411', thereby protecting against damage of a peripheral structure.

Figure 11:
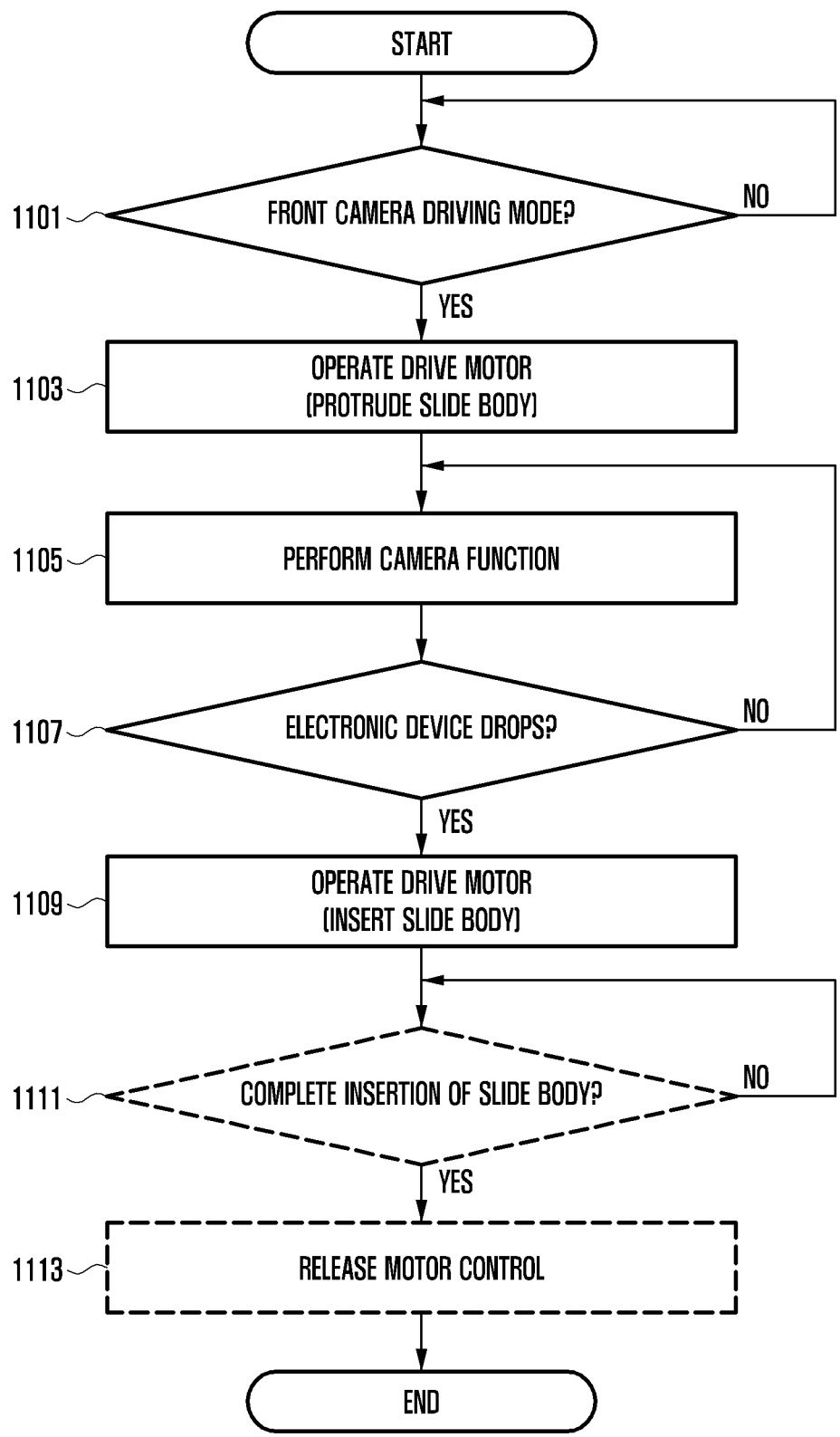
FIG. 11 is a flowchart illustrating an operation control of a slidable body through a drive motor when an electronic device drops according to certain embodiments of the disclosure.

FIG. 11 is a flowchart illustrating an operation control of a slidable body 220 through a drive motor 252 when an electronic device 200 drops according to certain embodiments of the disclosure.

Figure 12A:
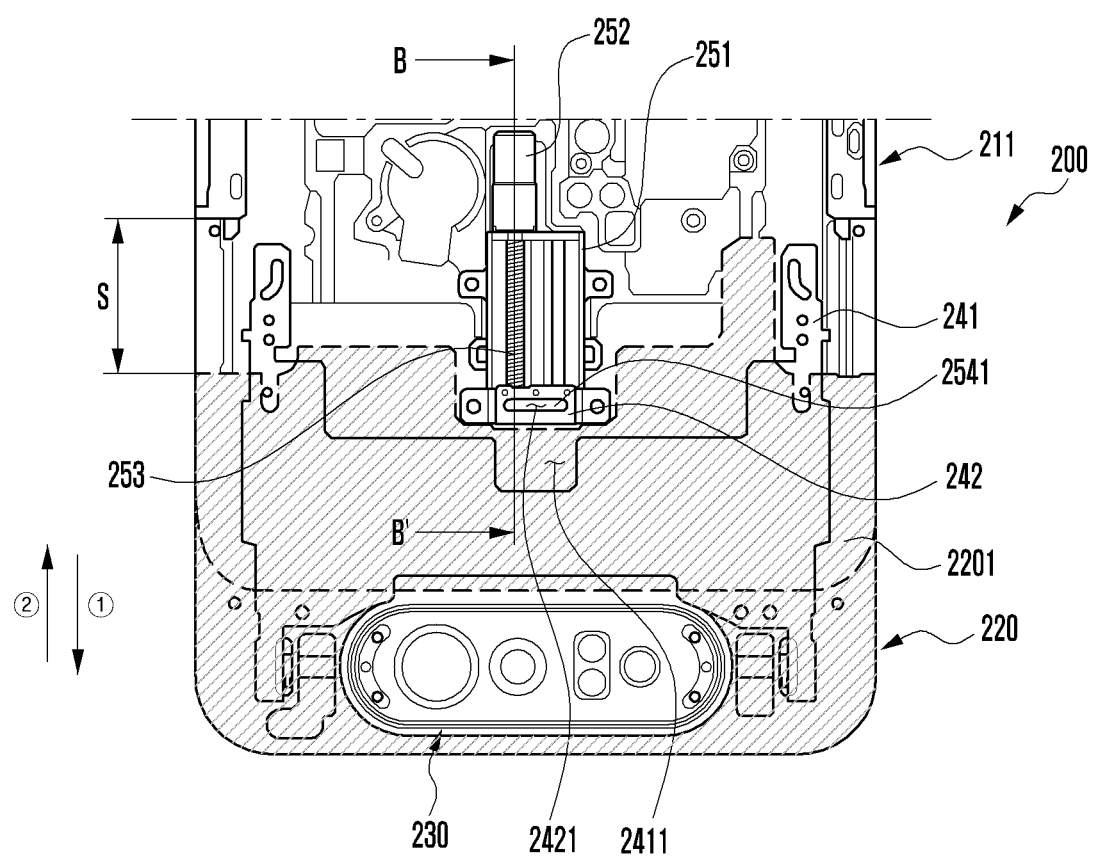
FIG. 12A is a partial diagram of an electronic device illustrating a state in which a slidable body is protruded according to certain embodiments of the disclosure.
Figure 12B:
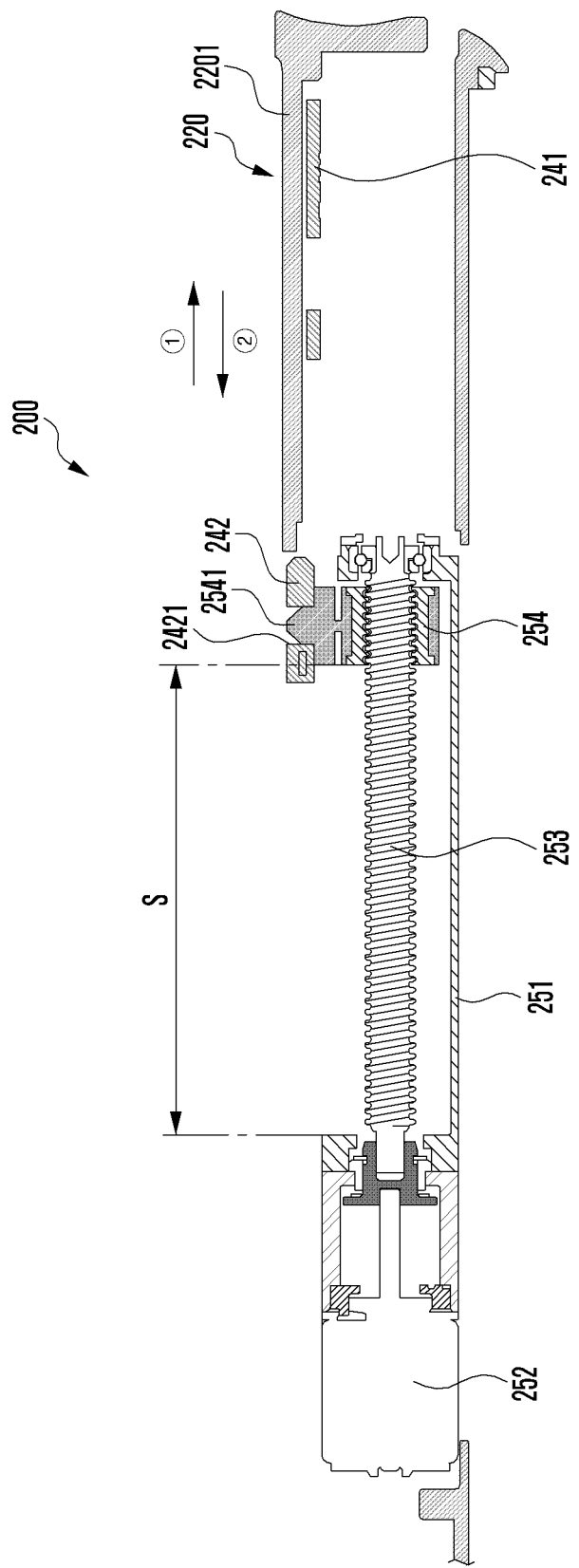
FIG. 12B is a partial cross-sectional view illustrating the electronic device viewed along line BB' of FIG. 12A according to certain embodiments of the disclosure.

FIG. 12A is a partial diagram of an electronic device 200 illustrating a state in which a slidable body 220 is protruded according to certain embodiments of the disclosure, and FIG. 12B is a partial cross-sectional view illustrating the electronic device 200 viewed along line BB' of FIG. 12A according to certain embodiments of the disclosure.

Figure 13A:
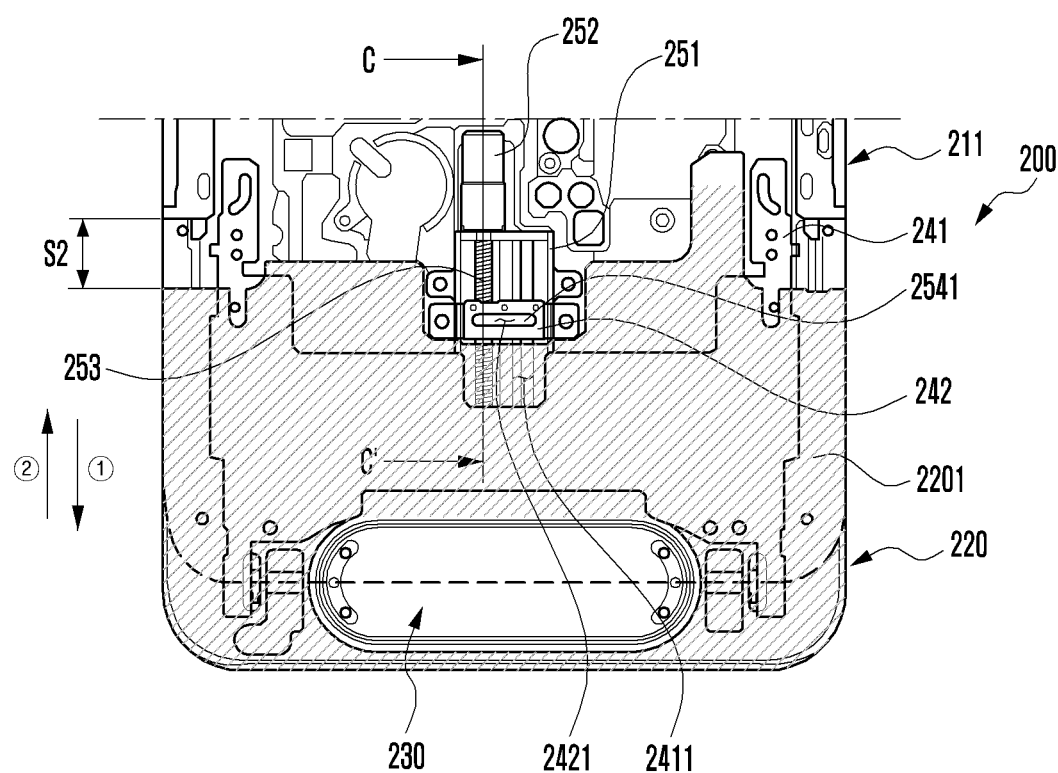
FIG. 13A is a partial diagram of an electronic device illustrating a state in which a slidable body is moved by a movable distance through a drive motor until immediately before a collision after drop detection according to certain embodiments of the disclosure.
Figure 13B:
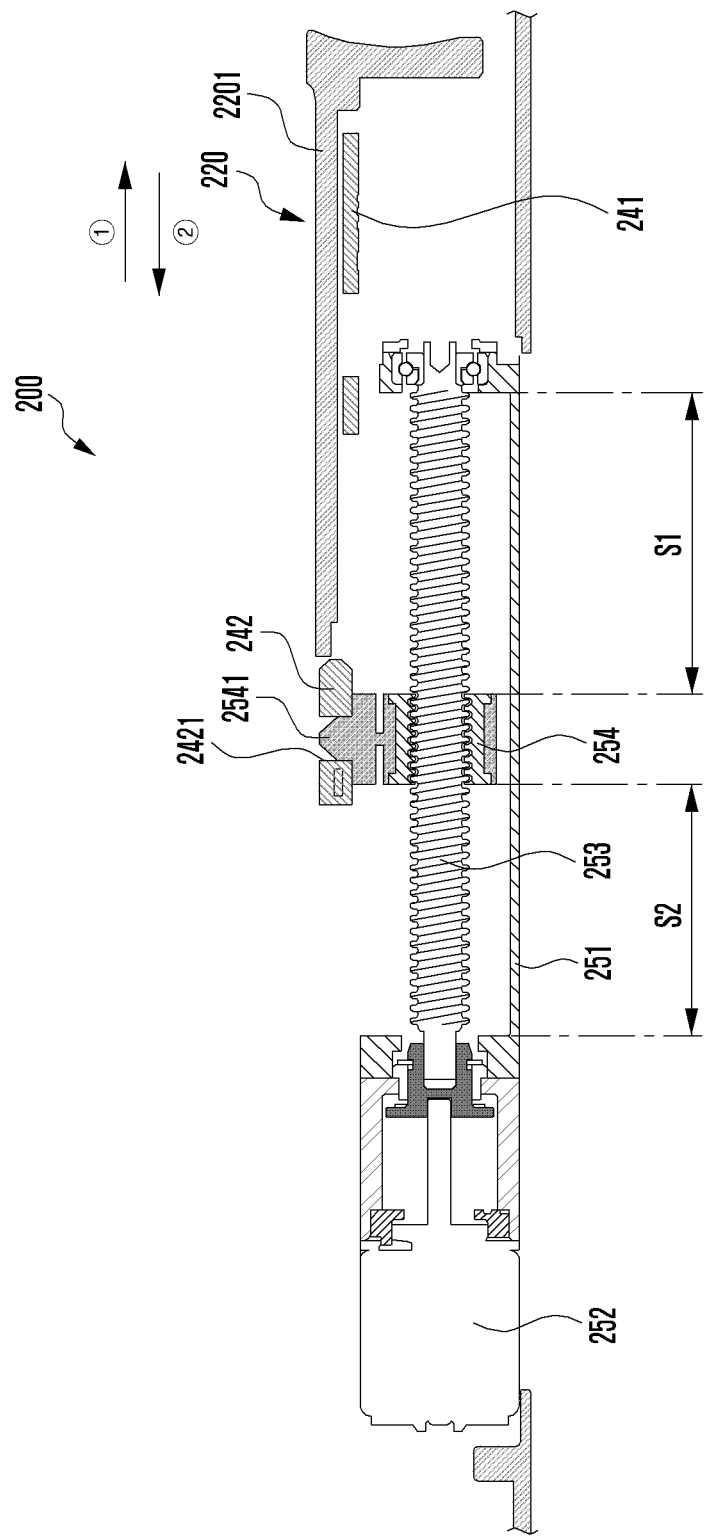
FIG. 13B is a partial cross-sectional view illustrating the electronic device viewed along line CC' of FIG. 13A according to certain embodiments of the disclosure.

FIG. 13A is a partial diagram of an electronic device 200 illustrating a state in which a slidable body 220 is moved by a movable distance through a drive motor 252 until immediately before a collision after drop detection according to certain embodiments of the disclosure. FIG. 13B is a partial cross-sectional view illustrating the electronic device 200 viewed along line CC' of FIG. 13A according to certain embodiments of the disclosure.

Figure 14A:
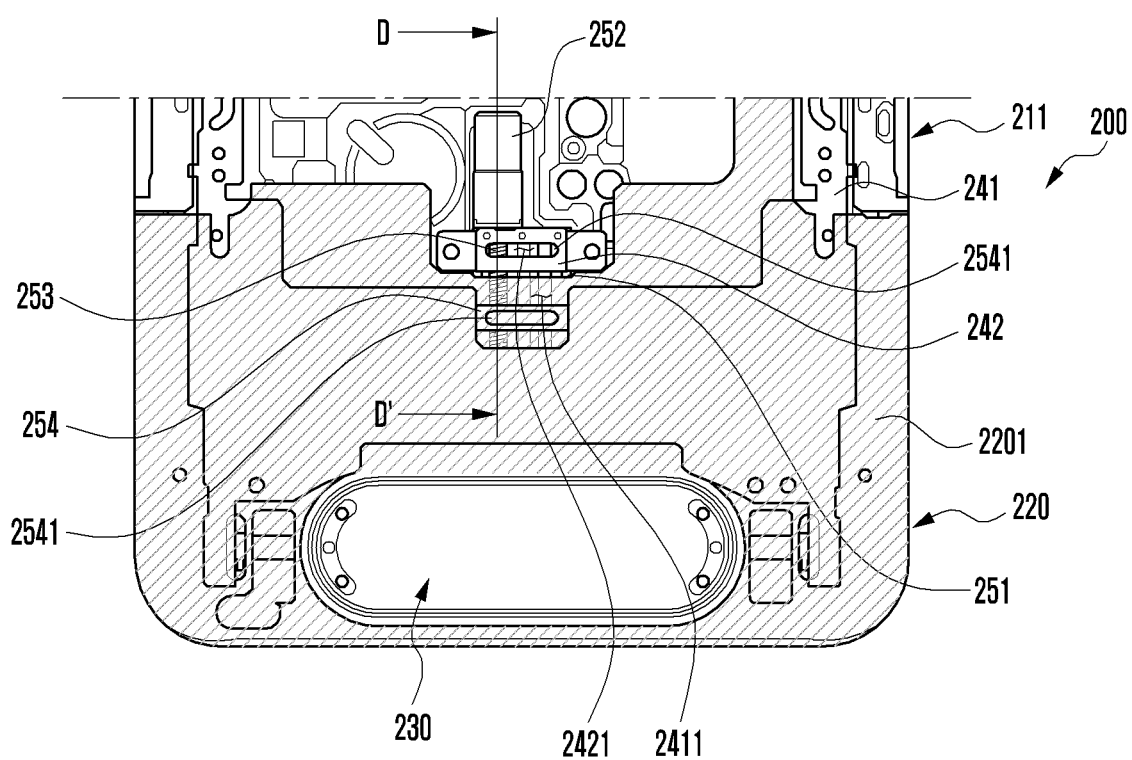
FIG. 14A is a partial diagram of an electronic device illustrating a state in which a slidable body is inserted by a remaining moving distance after a collision according to certain embodiments of the disclosure.
Figure 14B:
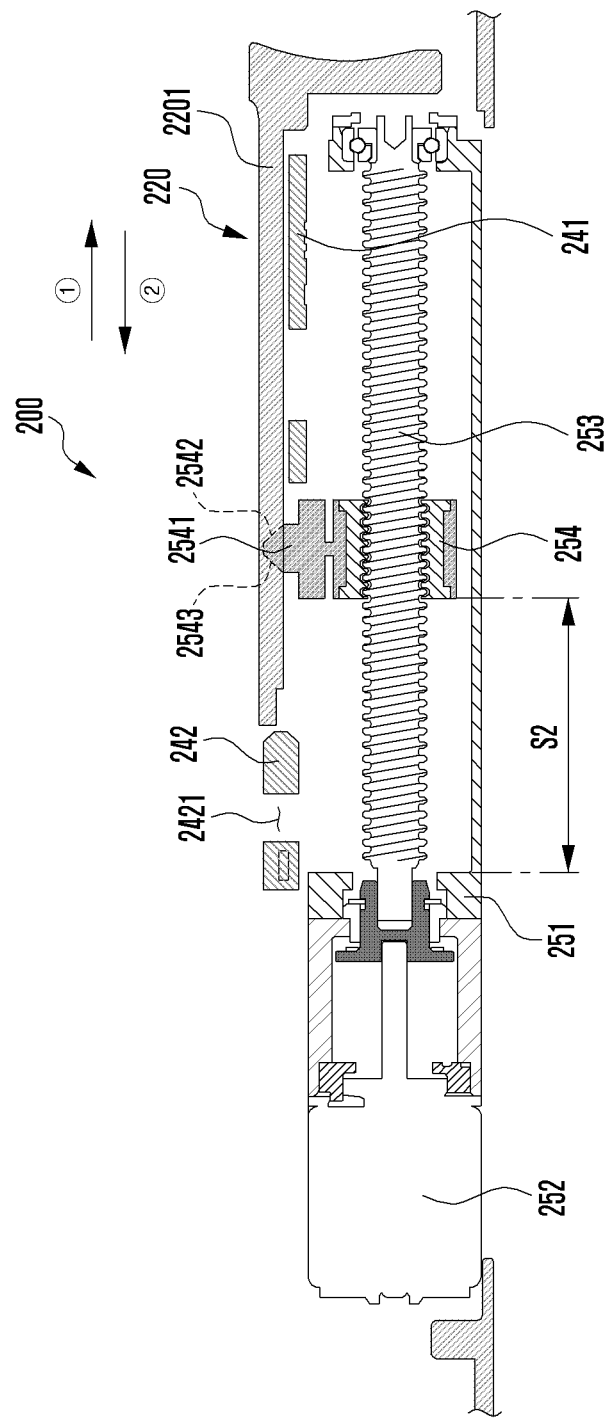
FIG. 14B is a partial cross-sectional view illustrating the electronic device viewed along line D-D' of FIG. 14A according to certain embodiments of the disclosure.

FIG. 14A is a partial diagram of an electronic device 200 illustrating a state in which a slidable body 220 is inserted by a remaining moving distance S2 after a collision according to certain embodiments of the disclosure. FIG. 14B is a partial cross-sectional view illustrating the electronic device 200 viewed along line D-D' of FIG. 14A according to certain embodiments of the disclosure.

With reference to FIGS. 11 to 14B, in operation 1101, the processor (e.g., the processor 120 of FIG. 1) of the electronic device 200 may detect whether the electronic device 200 is in a front camera driving mode (e.g., selfie driving mode). According to an embodiment, the processor 120 may detect a related event for driving the camera module assembly 230 by a user. In another embodiment, the processor 120 may detect whether the electronic device 200 has been entered in a mode for performing a function through at least one sensor module (e.g., the sensor module 232 of FIG. 2B) (e.g., optical flow sensor module) included in the camera module assembly 230.

According to certain embodiments, in operation 1103, when the electronic device 200 is in a front camera driving mode, the electronic device 200 may operate the drive motor 252. According to an embodiment, by an operation of the drive motor 252, the slidable body 220 may be penetrated in the direction ①.

With reference to FIGS. 12A and 12B, the slidable body 220 may receive a driving force of the drive motor 252 to be protruded by an entire moving distance S in the direction ① (direction in which the slidable body is protruded). For example, by a rotation of the driving shaft 253 through the drive motor 252, the nut frame 254 may be moved in the direction ①, and the slidable body 220 may be operated in conjunction through a coupling structure in which the latch projection 2541 of the nut frame 254 is inserted into the latch groove 2421 of the locker 242 fixed to the slidable body 220.

According to certain embodiments, in operation 1105, the electronic device 200 may perform a camera function using the camera module assembly 230 rotated in a direction (e.g., Z-axis direction of FIG. 2A) in which the front cover (e.g., the front cover 202 of FIG. 2A) faces in a state in which the slidable body 220 is protruded. In another embodiment, the electronic device 200 may perform the corresponding function through at least one sensor module (e.g., at least one sensor module 233 of FIG. 2B) included the camera module assembly 230 rotated in a direction (e.g., Z-axis direction of FIG. 2A) in which the front cover (e.g., the front cover 202 of FIG. 2A) faces.

According to certain embodiments, in operation 1107, the electronic device 200 may detect whether a droppage (e.g., which is a main cause of an external impacts to portable devices) has occurred in a state in which the slidable body 220 is protruded. According to an embodiment, the electronic device 200 may detect a drop thereof through at least one sensor module (e.g., the sensor module 176 of FIG. 1), such as an acceleration sensor, which in some embodiments detects a drop when detecting an acceleration value greater than a predetermined threshold and/or in a predetermined direction (e.g., downwards).

According to certain embodiments, in operation 1109, when the electronic device 200 detects a drop, the electronic device 200 may operate the drive motor 252 to move the slidable body 220 in a direction ② to stow the same. In this case, a movable distance (e.g., the movable distance S1 of FIG. 13B) of the slidable body 220 in the direction ② may be determined according to a drop height of the electronic device 200 (e.g., the drop height may be detected by a height detection sensor). According to an embodiment, the movable distance (e.g., the movable distance S1 of FIG. 13B) of the slidable body 220 in the direction ② may be determined according to a drop time from a time point in which a drop of the electronic device 200 is detected to a time point immediately before a collision.

As illustrated in FIGS. 13A and 13B, the slidable body 220 may be moved in the direction ② (e.g., a direction in which the slidable body is inserted) by a rotation of the drive motor 252. In this case, the slidable body 220 may be inserted into the electronic device 200 by the movable distance S1. For example, by a rotation of the driving shaft 253 through the drive motor 252, the nut frame 254 may be moved in the direction ②, and the slidable body 220 may be inserted as far as is possible until a time point immediately before the impact/collision of the electronic device 200, through a coupling structure in which the latch projection 2541 of the nut frame 254 is inserted into the latch groove 2421 of the locker 242 fixed to the slidable body 220.

According to certain embodiments, the insertable distance S1 of the slidable body 220 may be determined through Equation 1.

$$S1 = v\sqrt{\frac{2h}{g}} \quad \text{[Equation 1]}$$

S1 is a movable distance of the slidable body 220 from drop detection to immediately before a collision of the electronic device 200, v is a rotational speed of the drive motor 252, h is a drop height of the electronic device 200, and g is acceleration of gravity. Therefore, through the above-described Equation 1, the movable distance S1 of the slidable body 220 from drop detection to immediately before a collision of the electronic device 200 may be determined.

With reference to FIGS. 14A and 14B, when the electronic device 200 collides with the ground (e.g., when the slidable body collides with the ground), the slidable body 220 may receive an excessive force to be inserted into the electronic device 200. In this case, the latch protrusion 2541 of the nut frame 254 may be separated from the latch groove 2421 of the locker 242. For example, the latch protrusion 2541 may be separated from the latch groove 2421 without being damaged through the first inclined portion (e.g., the first inclined portion 2542 of FIG. 8). According to an embodiment, when the latch projection 2541 is separated from the latch groove 2421, the nut frame 254 maintains a position thereof in the guide shaft 255, and the locker 242 may be moved by the remaining movement distance S2 in the direction ② together with the slidable body 220.

According to certain embodiments, the remaining movement distance S2 in which the slidable body 220 is inserted into the electronic device after a collision may also be determined through the movable distance S1 of the slidable body 220 determined through Equation 1. According to an embodiment, through the determined remaining movement distance S2, the escape depth (e.g., the escape depth of FIG. 9) of the above-described escape area (e.g., the escape area 2411 of FIG. 9) of the slide plate 241 may be determined. For example, when the escape depth d is set to be deeper than the remaining travel distance S2 of the slidable body 220, at least a portion of the nut frame 254 or the latch projections 2541 is received in the escape area 2411 after the collision; thus, damage and/or deformation of the nut frame 254, the guide shaft 255, the locker 242, or the slide plate 241 according to a movement of the slide plate 241 can be prevented.

According to certain embodiments, the electronic device may additionally perform operations 1111 and 1113.

In operation 1111, the electronic device 200 may detect a state in which the slidable body 220 is inserted. According to an embodiment, the electronic device 200 may detect complete insertion of the slidable body 220 in a method of detecting a magnetic force of at least one magnet disposed in the slidable body 220 through a magnetic force detection sensor (e.g., hall sensor) disposed in the internal space of the housing structure 210.

According to certain embodiments, in operation 1113, when complete insertion of the slidable body 220 is detected, the electronic device 200 may stop an operation of the drive motor 252. For example, when the operation of the drive motor 252 is stopped, the drive motor 252 is switched to an idle state in which the nut frame 254 may be arbitrarily moved through the guide shaft 255, thereby preventing a malfunction of the drive motor. In another embodiment, the electronic device 200 may insert the slidable body 220 by a movable distance S1 through the drive motor 252 for a predetermined time from a drop time point to immediately before collision and then stop an operation of the drive motor 252.

Figure 15A:
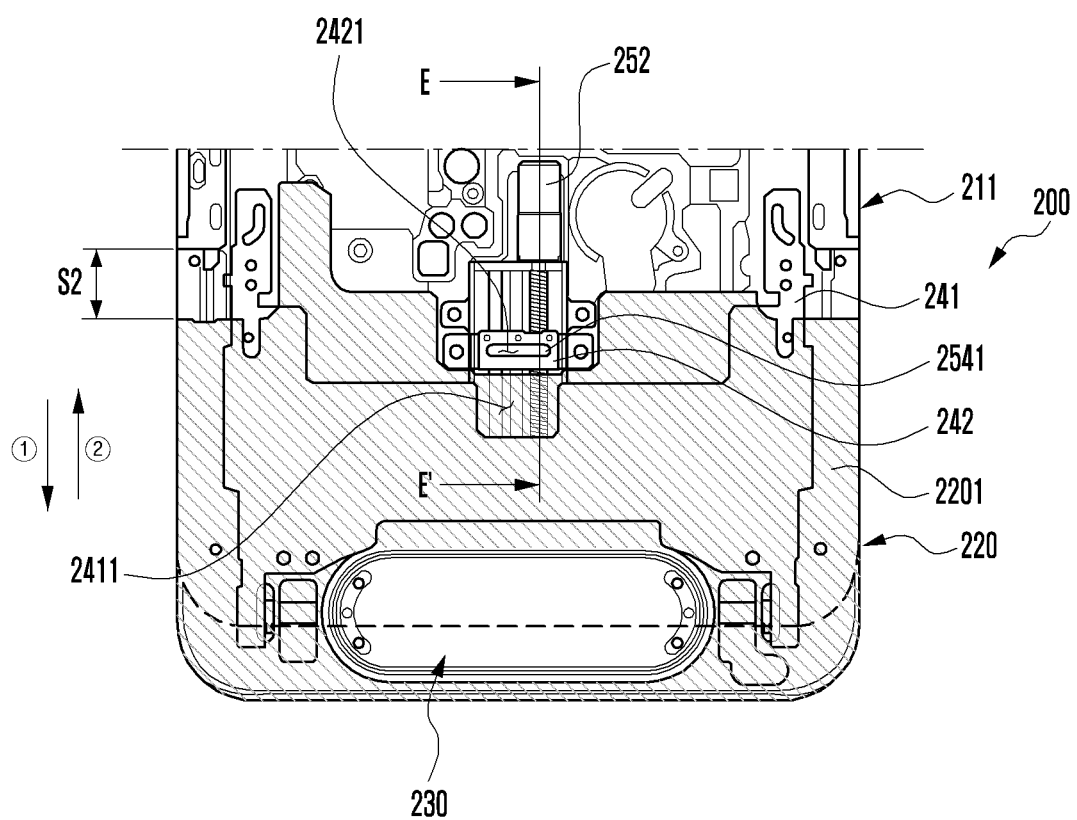
FIG. 15A is a partial diagram of an electronic device illustrating a state in which a slidable body is protruded by a remaining moving distance by a user's manipulation according to certain embodiments of the disclosure.
Figure 15B:
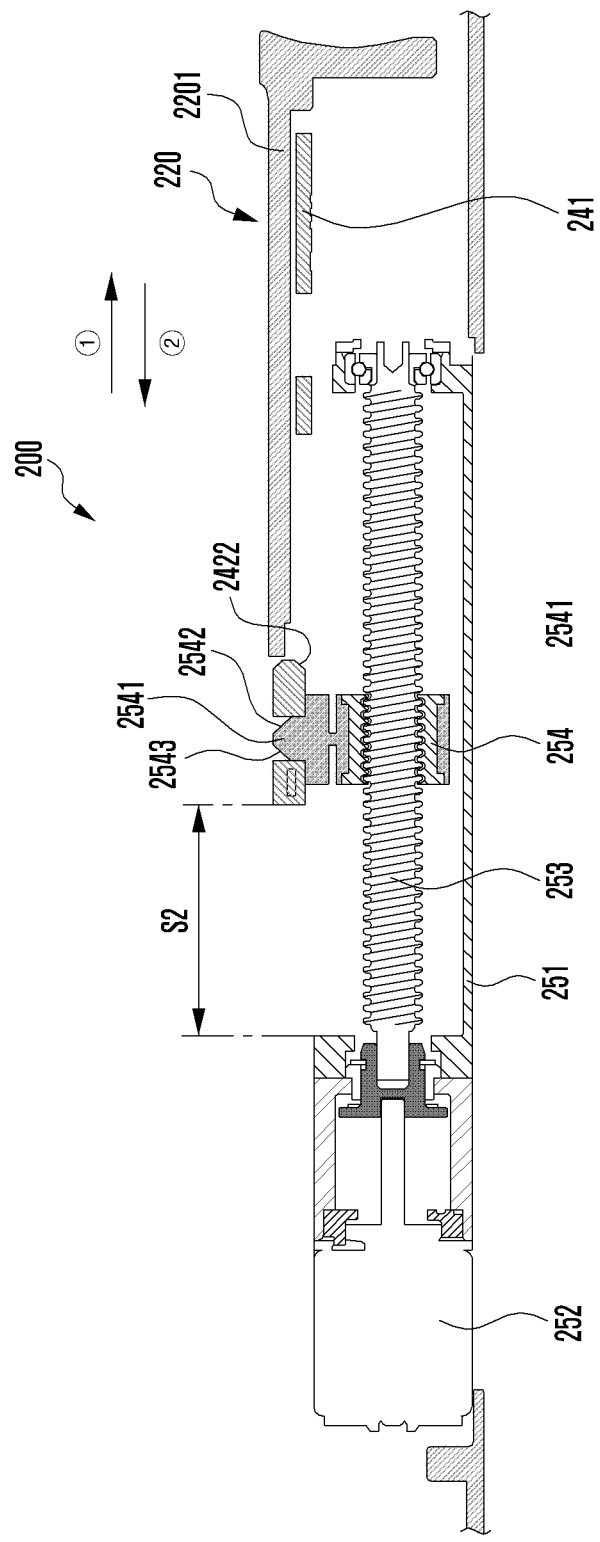
FIG. 15B is a partial cross-sectional view illustrating the electronic device viewed along line E-E' of FIG. 15A according to certain embodiments of the disclosure.
Figure 15C:
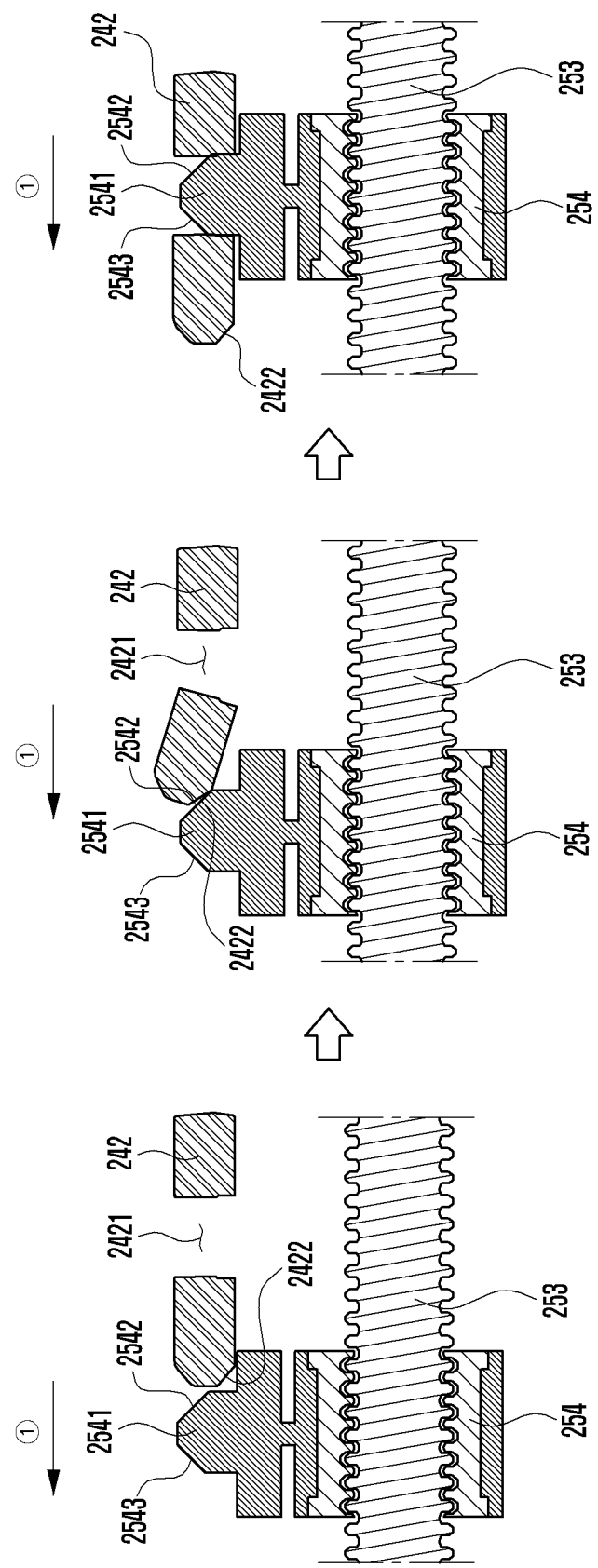
FIG. 15C is an operation diagram illustrating a state in which a latch protrusion of a nut frame is latched to a latch groove of a locker by a manipulation of FIG. 15A according to certain embodiments of the disclosure.

FIG. 15A is a partial diagram of an electronic device 200 illustrating a state in which a slidable body 220 is protruded by a remaining moving distance S2 by a user manipulation according to certain embodiments of the disclosure. FIG. 15B is a partial cross-sectional view illustrating the electronic device 200 viewed along line E-E' of FIG. 15A according to certain embodiments of the disclosure. FIG. 15C is an operation diagram illustrating a state in which a latch protrusion 2541 of a nut frame 254 is latched to a latch groove 2421 of a locker 242 by a manipulation of FIG. 15A according to certain embodiments of the disclosure.

With reference to FIGS. 15A to 15C, when the latch projection 2541 of the nut frame 254 is separated from the latch groove 2421 of the locker 242 by a droppage of the electronic device 200, the slidable body 220 may maintain an insertion state. According to an embodiment, the slidable body 220 may be moved again in the direction ① (e.g., the direction for extension) through user manipulation. According to an embodiment, when the slidable body 220 is extended in the direction ① by the remaining movement distance S2, the locker 242 may contact the latch projection 2541 of the nut frame 254. In this case, when the slidable body 220 is further extended by a predetermined force that is pressing in the direction ①, a second inclined portion 2543 of the latch protrusion 2541 may be moved on an inclined surface 2422 of the locker 242, whereby the latch protrusion 2541 may be inserted into the latch groove 2421 of the locker 242. Therefore, the latch projection 2541 of the nut frame 254 is latched to the latch groove 2421 of the locker 242; thus, the slidable body 220 may be restored to a state in which a sliding motion through the drive motor 252 is possible again.

According to certain embodiments of the disclosure, when an external impact such as a drop occurs, a coupling structure for connecting the slidable body and the main body of the electronic device is separated; thus, damage can be prevented, and after separation, easy recovery is possible; thus, operational reliability of a product can be improved.

According to certain embodiments, an electronic device (e.g., the electronic device 200 of FIG. 2A) may include a housing (e.g., the housing 210 of FIG. 2A); a slidable body (e.g., the slidable body 220 of FIG. 2B) slidably disposed from the housing; a driver (e.g., the driver 250 of FIG. 4) disposed in the housing and configured to move the slidable body, such that the driver includes a drive motor (e.g., the drive motor 252 of FIG. 8); a driving shaft (e.g., the driving shaft 253 of FIG. 8) rotatably disposed through the drive motor; and a nut frame (e.g., the nut frame 254 of FIG. 8) including a latch protrusion (e.g., the latch protrusion 2541 of FIG. 8) disposed to reciprocate in a longitudinal direction of the driving shaft according to a rotation of the driving shaft and protruded in a direction of the slidable body; and a slide hinge (e.g., the slide hinge 240 of FIG. 4) disposed at the slidable body and connected to the driver, such that the slide hinge includes a slide plate (e.g., the slide plate 241 of FIG. 9) fixed to the slidable body; and a locker (e.g., the locker 242 of FIG. 8) including a latch groove (e.g., the latch groove 2421 of FIG. 8) disposed on the same plane as that of the slide plate in the slidable body and into which the latch protrusion is inserted, such that when the latch projection is inserted into the latch groove, the slidable body is moved by the driver, and the slide plate includes an escape area (e.g., the escape area 2411 of FIG. 9) configured to receive at least a portion of the nut frame and/or the latch protrusion when the latch protrusion is separated from the latch groove by an external impact caused by a drop.

According to certain embodiments, the latch protrusion may include at least a partially tapered first inclined portion (e.g., the first tapered portion 2542 of FIG. 8) in order to induce separation from the latch groove.

According to certain embodiments, the latch projection may include a second inclined portion (e.g., the second inclined portion 2543 of FIG. 8) at least partially tapered in order to guide coupling to the separated latch groove and configured to face in a direction opposite to that of the first inclined portion.

According to certain embodiments, the locker may include an inclined surface (e.g., the inclined surface 2422 of FIG. 8) formed in a portion facing the second inclined portion in the separated state.

According to certain embodiments, the electronic device may further include a motor housing (e.g., the motor housing 251 of FIG. 8) disposed to support the drive motor inside the housing and configured to rotatably receive the driving shaft.

According to certain embodiments, the nut frame may be screwed in a manner in which the driving shaft is penetrated.

According to certain embodiments, the electronic device may further include a guide shaft (e.g., the guide shaft 255 of FIG. 8) disposed in a manner penetrating the nut frame at one side of the driving shaft.

According to certain embodiments, the housing may include a front cover (e.g., the front cover 202 of FIG. 2A) disposed at substantially a front surface (e.g., the front surface 210a of FIG. 2A); a rear cover (e.g., the front cover 202 of FIG. 2B) configured to face in a direction opposite to that of the front cover and to form a portion of a rear surface (e.g., the rear surface 210b of FIG. 2B); and a side member (e.g., the side member 211 of FIG. 2B) configured to enclose a space between the front cover and the rear cover and to form at least partially a side surface, the slidable body may be slidably disposed through at least a portion of the side member.

According to certain embodiments, the slidable body may form a first rear surface (e.g., the first rear surface 210b of FIG. 2B) having substantially the same size as that of the front surface together with the rear cover in a state in which the slidable body is inserted into the housing.

According to certain embodiments, the slidable body may form a second rear surface (e.g., the second rear surface 210b' of FIG. 3B) having a size substantially larger than that of the first rear surface together with the rear cover in a state in which the slidable body is protruded from the housing.

According to certain embodiments, the electronic device may further include a display (e.g., the display 201 of FIG. 2A) disposed in the internal space, and visible from an exterior of the device through at least a portion of the front cover.

According to certain embodiments, the electronic device may further include at least one sensor module (e.g., the sensor module 176 of FIG. 1); and at least one processor (e.g., the processor 120 of FIG. 1) configured to detect a drop of the electronic device through the at least one sensor module and to control the drive motor according to the detection result.

According to certain embodiments, when the processor detects a drop of the electronic device, the processor may control the drive motor.

According to certain embodiments, in a state in which the slidable body is protruded from the housing, when the processor detects a drop of the electronic device, the processor may control the drive motor to operate in a direction in which the slidable body is to be inserted.

According to certain embodiments, a movable distance (e.g., the movable distance S1 of FIG. 13B) of the slidable body from drop detection to immediately before a collision may be calculated through Equation 2.

$$S1 = v\sqrt{\frac{2h}{g}}$$ [Equation 2]

where S1 is a movable distance of the slidable body from drop detection of the electronic device to immediately before a collision, v is a rotational speed of the drive motor, his a drop height of the electronic device, and g is acceleration of gravity.

According to certain embodiments, an escape depth d (e.g., the escape depth d of FIG. 9) of the escape area (e.g., the escape area 2411 of FIG. 9) may be determined based on the movable distance (e.g., the movable distance S1 of FIG. 13B) of the slidable body.

According to certain embodiments, the at least one sensor module may include an acceleration sensor.

According to certain embodiments, the electronic device (e.g., the electronic device 200 of FIG. 2A) may include a housing (e.g., the housing 210 of FIG. 2A) including a first cover (e.g., the first cover 202 of FIG. 2A), a second cover (e.g., the rear cover 204 of FIG. 2A) facing in a direction opposite to that of the first cover, and a side member (e.g., the support member 211 of FIG. 4) enclosing a space between the first cover and the second cover and at least partially including a support member (e.g., the support member 2111 of FIG. 4); a slidable body (e.g., the slidable body 220 of FIG. 8) slidably disposed from the housing to the outside of the electronic device; a drive motor (e.g., the drive motor 252 of FIG. 8) disposed in the support member in the space; a driving shaft (e.g., the driving shaft 253 of FIG. 8) rotatably disposed through the drive motor; a nut frame (e.g., the nut frame 254 of FIG. 8) including a latch protrusion (e.g., the latch protrusion 2541 of FIG. 8) disposed to reciprocate in a longitudinal direction of the driving shaft according to a rotation of the driving shaft and protruded in a direction of the slidable body; a slide plate (e.g., the slide plate 241 of FIG. 9) fixed to the slidable body; and a locker (e.g., the locker 242 of FIG. 8) including a latch groove (e.g., the latch groove 2421 of FIG. 8) disposed on the same plane as that of the slide plate in the slidable body and into which the latch protrusion is inserted, such that when the latch projection is inserted into the latch groove, the slidable body is moved by driving the drive motor, and the slide plate includes an escape area (e.g., the escape area 2411 of FIG. 9) configured to receive at least a portion of the nut frame and/or the latch protrusion when the latch protrusion is separated from the latch groove by an external impact caused by a drop.

According to certain embodiments, the electronic device may further include at least one sensor module (e.g., the sensor module 176 of FIG. 1); and at least one processor (e.g., the processor 120 of FIG. 1) configured to detect a drop of the electronic device through the at least one sensor module and to control the drive motor to operate in a direction in which the slidable body is to be inserted in a state in which the slidable body is protruded from the housing.

According to certain embodiments, an escape depth (e.g., the escape depth d of FIG. 9) of the escape area may be determined based on a movable distance (e.g., the movable distance S1 of FIG. 9) of the slidable body moved through the drive motor from drop detection of the electronic device to immediately before a collision.

The embodiments of the disclosure disclosed in this specification and drawings present a specific example in order to easily describe the technical contents according to an embodiment of the disclosure and to help an understanding of the embodiments of the disclosure, and they do not intend to limit the embodiments of the disclosure. Accordingly, all changes or modifications derived from the technical idea of certain embodiments of the disclosure in addition to the embodiments described herein should be construed as being included in certain embodiments of the disclosure without departing from the disclosure.

What is claimed is:

1. An electronic device, comprising:
   a housing;
   a slidable body coupled in the housing;
   a driver disposed in the housing and configured to drive movement of the slidable body, the driver including:
     a drive motor;
     a rotatable drive shaft disposed through the drive motor; and
     a nut frame including a latch projection disposed to reciprocate in a longitudinal direction of the rotatable drive shaft according to rotation of the rotatable drive shaft, and protruding in a direction of the slidable body; and
   a slide hinge disposed on the slidable body and coupled to the driver, the slide hinge including:
     a slide plate coupled to the slidable body; and
     a locker including a latch groove disposed on a same plane as that defined by a surface of the slide plate in the slidable body, and into which the latch projection is inserted,
   wherein, when the latch projection is inserted into the latch groove, the slidable body is moved by the driver, and
   wherein the slide plate defines an escape area configured to receive at least a portion of the nut frame and/or the latch projection, when an external impact causes the latch projection to separate from the latch groove.

2. The electronic device of claim 1, wherein the latch projection includes at least a partially tapered first inclined portion configured to induce separation from the latch groove.

3. The electronic device of claim 2, wherein the latch projection includes a second inclined portion that is at least partially tapered to guide coupling of the latch projection and the separated latch groove, the latch projection oriented in a direction opposite to an orientation of the first inclined portion.

4. The electronic device of claim 3, wherein the locker includes an inclined surface, the inclined surface oriented as to face the second inclined portion when the locker and the latch projection are in a separated state.

5. The electronic device of claim 1, further including a motor housing supporting the drive motor disposed within the housing, the drive motor configured to rotatably receive the rotatable drive shaft in the motor housing.

6. The electronic device of claim 1, wherein the nut frame is fastened by a fastener penetrated through the rotatable drive shaft.

7. The electronic device of claim 2, further comprising a guide shaft penetrating the nut frame at one side of the rotatable drive shaft.

8. The electronic device of claim 1, wherein the housing comprises:
- a front cover disposed at substantially a front surface of the housing;
- a rear cover facing a direction opposite to that of the front cover, and forming a portion of a rear surface of the housing; and
- a side member enclosing a space defined between the front cover and the rear cover and forming at least partially a side surface of the housing,
- wherein the slidable body is slidably disposed through at least a portion of the side member.

9. The electronic device of claim 8, wherein the slidable body forms a first rear surface of the housing, such that the first rear surface is substantially a same size as that of the front surface together with the rear cover, when the slidable body is stowed in the housing.

10. The electronic device of claim 9, wherein the slidable body forms a second rear surface of the housing, the second rear surface substantially larger than the first rear surface together with the rear cover, when the slidable body is extended from the housing.

11. The electronic device of claim 8, further comprising a display, disposed in an internal space defined within the housing, the display visible from an exterior of the device through at least a portion of the front cover.

12. The electronic device of claim 1, further comprising:
- at least one sensor module; and
- at least one processor configured to:
- detect droppage of the electronic device using the at least one sensor module, and
- control the drive motor according to the detection result.

13. The electronic device of claim 12, wherein controlling the drive motor further includes actuating the drive motor when the droppage of the electronic device is detected.

14. The electronic device of claim 13, wherein the drive motor is actuated by the processor to stow the slidable body in the housing when the droppage is detected while the slidable body is extended from the housing.

15. The electronic device of claim 14, wherein a movable distance S1 of the slidable body from a time of detecting the droppage to a time immediately before collision resulting from the droppage is calculated using Equation 3:

$$S1 = v\sqrt{\frac{2h}{g}} \quad \text{[Equation 3]}$$

where S1 is the movable distance, v is a rotational speed of the drive motor, h is a drop height of the electronic device, and g is acceleration of gravity.

16. The electronic device of claim 15, wherein an escape depth d of the escape area is determined based on the movable distance S1 of the slidable body.

17. The electronic device of claim 12, wherein the at least one sensor module comprises an acceleration sensor.

18. An electronic device, comprising:
- a housing including a first cover, a second cover facing a direction opposite to that of the first cover, and a side member enclosing a space defined between the first cover and the second cover, the side member including a support member extended to the space;
- a slidable body coupled to the housing and extendable from an interior of the housing to a exterior of the electronic device;
- a drive motor disposed in the support member;
- a rotatable drive shaft disposed through the drive motor;
- a nut frame including a latch protrusion disposed to reciprocate along a longitudinal axis of the rotatable drive shaft according to a rotation of the rotatable drive shaft and protruded in a direction of the slidable body;
- a slide plate fixed to the slidable body; and
- a locker comprising a latch groove disposed on a same plane as that defined by a surface of the slide plate in the slidable body and into which the latch protrusion is inserted,
- wherein, when the latch protrusion is inserted into the latch groove, the slidable body is moved by actuation of the drive motor, and
- wherein the slide plate defines an escape area configured to receive at least a portion of the nut frame and/or the latch protrusion, when an external impact causes the latch protrusion to separate from the latch groove.

19. The electronic device of claim 18, further comprising:
- at least one sensor module; and
- at least one processor configured to:
- detect a droppage of the electronic device using the at least one sensor module,
- control the drive motor to actuate such that the slidable body is stowed in the housing when the droppage is detected while the slidable body is extended from the housing.

20. The electronic device of claim 19, wherein an escape depth d of the escape area is determined based on a movable distance S1 of the slidable body, as moved by actuation of the drive motor based on detection of the droppage.

* * * * *